United States Patent [19]

Kiuchi

[11] Patent Number: 5,644,740

[45] Date of Patent: Jul. 1, 1997

[54] METHOD AND APPARATUS FOR DISPLAYING ITEMS OF INFORMATION ORGANIZED IN A HIERARCHICAL STRUCTURE

[75] Inventor: Itsuko Kiuchi, Tokyo, Japan

[73] Assignee: Hitachi, Ltd., Tokyo, Japan

[21] Appl. No.: 160,231

[22] Filed: Nov. 30, 1993

[30] Foreign Application Priority Data

Dec. 2, 1992 [JP] Japan ................................ 4-349855

[51] Int. Cl.⁶ ............................................... G06F 17/30
[52] U.S. Cl. ........................................ 395/357; 395/356
[58] Field of Search ................................. 395/12, 51, 54, 395/63, 155, 157, 160, 161, 600, 356, 357; 364/419.19; 345/146, 902

[56] References Cited

U.S. PATENT DOCUMENTS

| | | | |
|---|---|---|---|
| 4,318,184 | 3/1982 | Millett et al. | 395/600 |
| 4,613,946 | 9/1986 | Forman | 395/160 |
| 4,710,763 | 12/1987 | Franke et al. | 395/160 X |
| 4,868,733 | 9/1989 | Fujisawa et al. | 395/600 |
| 5,262,761 | 11/1993 | Scandura et al. | 395/160 X |
| 5,295,230 | 3/1994 | Kung | 395/75 |
| 5,394,522 | 2/1995 | Sanchez-Frank et al. | 395/159 |
| 5,404,506 | 4/1995 | Fujisawa et al. | 395/600 |
| 5,406,477 | 4/1995 | Harhen | 395/51 X |
| 5,418,946 | 5/1995 | Mori | 395/600 |
| 5,428,712 | 6/1995 | Elad et al. | 395/51 |
| 5,428,737 | 6/1995 | Li et al. | 395/161 |
| 5,428,776 | 6/1995 | Rothfield | 395/155 X |
| 5,493,678 | 2/1996 | Arcuri et al. | 395/600 |
| 5,504,851 | 4/1996 | Maesano et al. | 395/157 |
| 5,553,226 | 9/1996 | Kiuchi et al. | 395/161 |
| 5,568,640 | 10/1996 | Nishiyama et al. | 395/600 |

FOREIGN PATENT DOCUMENTS 1-140332 of 1989 Japan.
5-128157 1/1993 Japan.

OTHER PUBLICATIONS

"Macintosh User's Guide for Desktop Macintosh Computers," (Macintosh User's Guide), Apple Japan, pp. 120 and 238. (Provided in Japanese).

"Microsoft Windows Version 3.1 Getting Started with Microsoft Windows for Microsoft Windows Operating System Gateway 2000 Edition," pp. 37–43. (Provided in English).

Primary Examiner—Raymond J. Bayerl
Assistant Examiner—Crescelle N. dela Torre
Attorney, Agent, or Firm—Fay, Sharpe, Beall, Fagan, Minnich & McKee

[57] ABSTRACT

In method of displaying items of information organized in a hierarchical structure, a hierarchical tree of nodes is displayed, which are items of information, classified based on a specified concept. The user selects an intended node from among the nodes on the displayed hierarchical tree and enters a concept for classifying nodes of sub-concepts of the selected nodes. The selected node and a partial hierarchical tree that is created based on the entered; concept are displayed.

7 Claims, 43 Drawing Sheets

FIG.5

| C# | CNAME | P/S | T/Q/C |
|---|---|---|---|
| 1 | UNIVERSAL | P | C |
| 2 | COMPANY | P | C |
| 3 | ORGANIZATION | P | C |
| 4 | ARTICLE ON INFORMATION RETRIEVAL SYSTEM | P | Q |
| 5 | PERSON | P | C |
| 5 | HUMAN | S | C |
| 6 | NATION | P | C |
| 7 | JAPAN | P | C |
| 8 | COMPANY CLASSIFIED BY SEAT | P | T |
| 9 | INFORMATION RETRIEVAL SYSTEM | P | C |
| 10 | TANAKA YOKO | P | C |
| 11 | DOCUMENT | P | C |
| 12 | ARTICLE | P | C |
| 13 | INTELLECTUAL ENTITY | P | C |

FIG.6

| PARENT | CHILD |
|---|---|
| 1 | 13 |
| 13 | 3 |
| 13 | 5 |
| 3 | 2 |
| 11 | 12 |
| 12 | 4 |
| 6 | 7 |
| 2 | 8 |
| 5 | 10 |
| ... | ... |

FIG.7

| RS# | RSNAME | LR | RL |
|---|---|---|---|
| 7 | NATIONALITY | NATIONALITY IS | IS NATIONALITY OF |
| 22 | PUBLISHED DOCUMENT | PUBLISHED DOCUMENT IS | IS PUBLISHED DOCUMENT |
| 23 | SUBJECT | SUBJECT IS | IS SUBJECT |

FIG.8

| R # | RS # | CL | CR | G/I |
|---|---|---|---|---|
| | ...807 | ...808 | ...809 | |
| 12 | 7 | 5 | 6 | G |
| | ...812 | ...813 | ...814 | |
| 17 | 22 | 3 | 11 | G |
| 18 | 7 | 10 | 7 | I |
| | 817 | ...818 | 819 | |

FIG.9

| C # | Image # |
|---|---|
| ... | ... |
| 10 | 3 |
| 22 | 4 |
| 35 | 5 |
| ... | ... |
| 10 | 12 |
| ... | ... |

FIG.10

| C # | Gr # |
|---|---|
| ... | ... |
| 5 | 3 |
| 3 | 4 |
| 33 | 5 |
| ... | ... |
| 40 | 12 |
| ... | ... |

CLASSIFICATION

CLASSIFY

2802 —
- ◇ SCHOOL OF GRADUATE — 2807
- ◆ PLACE OF WORK — 2808
- ◇ AGE — 2809
- ◇ TELEPHONE NUMBER — 2810

— 2803

ITEM OF CLASSIFICATION :
- ◆ LIST — 2811
- ◇ SELECT FROM TREE — 2812

2804 —
- ☐ A-COMPANY — 2713
- ☐ B-COMPANY — 2714
- ☐ C-COMPANY — 2715
- ☐ D-COMPANY — 2716

2805 — OK        CANCEL — 2806

METHOD AND APPARATUS FOR DISPLAYING ITEMS OF INFORMATION ORGANIZED IN A HIERARCHICAL STRUCTURE

BACKGROUND OF THE INVENTION

1. Field of the Invention

This invention relates to a method and apparatus for displaying items of information, e.g., data or files, organized in a hierarchical structure, the method and apparatus being capable of displaying portions of the hierarchical structure with which the user is concerned, displaying items of user's concern collectively, and displaying classified trees of items adapted to the user's intention.

2. Description of the Prior Art

Since the advent of compact capacious storage devices such as optical disk memories in recent years, the management and search of a vast amount of information have become routine tasks of the office job. For example, the storing, searching and management activities for a large-scale database, which used to be implemented by specialists, are now carried out by means of an office-oriented document filing system that is designed to be run by the user.

In the document filing system, documents and information are treated in a hierarchical structure in terms of key words and/or concepts in many cases. The hierarchical structure is displayed in the form of menu, on which the user selects items sequentially to reach the intended document or information. However, this menu-based search scheme is sometimes deficient in that if the user once steps in a wrong path, the user is obliged to retry the search from the beginning.

A conventional filing system that overcomes the above-mentioned problem by the application of the knowledge base is disclosed in U.S. Pat. No. 4,868,733 entitled "DOCUMENT FILING SYSTEM WITH KNOWLEDGE-BASE NETWORK OF CONCEPT INTERCONNECTED BY GENERIC, SUBSUMPTION AND SUPERCLASS RELATIONS".

Another proposal for displaying and browsing through a tree of concepts, which are stored in the form of hierarchical structure in a knowledge base, is described in Japanese patent publication JP-A-1-140332.

The following explains in brief the manner of knowledge expression in the knowledge base pertinent to the above-mentioned prior art. FIG. 2 is a diagram showing the manner of knowledge expression for the knowledge base, in which each ellipse represents a concept and each arrow represents the relation between two concepts. In the knowledge base, concepts are organized in a hierarchical structure based on the is-a relation and part-whole relation. All concepts in the knowledge base are linked together in is-a relations below the superlative concept "UNIVERSAL" 201. The is-a relation represents a relation "concept X is (a) concepts Y". Seen from a concept, another concept located above it is called a "super-concept" and another concept located below it is called a "sub-concept". A concept that shares a same super-concept with another concept is called an "appositive concept". For example, in the figure, "person" 212 has a super-concept "intellectual entity" 205, has sub-concepts "female" 220 and "Tanaka Yoko" 213, and has an appositive concept "organization" 206.

Some concepts are linked with other concepts in a part-whole relation. The part-whole relation represents a relation "concept X is part of concept Y". In the part-whole relation, a super-concept, i.e., a concept located above another one is called a "whole-concept" and a sub-concept, i.e., a concept located below another one is called a "part-concept". For example, "X-laboratory" 209 is a part-concept of "A-company" 208.

Each concept can have multiple is-a relations and multiple part-whole relations. For example, the "organization" 206 has two super-concepts of "intellectual entity" 205 and "place" 214 in its is-a relation.

In the knowledge base, things are expressed in terms of two concepts and one relation, i.e., binary relation. First, two generic concepts are related in terms of a generic relation. For example, "person" 212 and "nation" 215 are linked by a generic relation "nationality" 218. Next, two specific concepts are linked in terms of a instance relation. In order for two concepts to establish an instance relation, their super-concepts must be linked by a generic relation of the same name. For example, concepts "Tanaka Yoko" 213 and "Japan" 216 are linked by the instance relation "nationality" 219.

By tracing these relations that link concepts stored in the knowledge base, the user can "browse" through the concepts. It has become possible to make access to knowledge by entering a query, as described in the above-mentioned U.S. Pat. No. 4,868,733. For example, such queries as "article #0468 that covers the workstation developed by B-company seated in Tokyo" and "what company published the article that deals with the subject of information retrieval system ?" are entered to the knowledge base to make access to detailed information.

There have been proposed several methods of displaying the "concept network" of knowledge base that is based on the above-mentioned expression, as described in Japanese patent publication JP-A-1-140332 for example. According to the proposed display method, the system initially displays a hierarchical tree headed by the superlative concept "UNIVERSAL". The system includes a function of showing sub-concepts with a depth of m and a number of branches of n specified by the user for one concept existing on the tree, and a function of hiding sub-concepts of one concept. Further included in the system is a function of listing sub-concepts immediately below one concept, allowing the user to select one with a pointing device and showing the selected concept to the displayed hierarchical tree, a function of searching for concepts based on the matching of a partial character string, and a function of displaying super-concepts of one concept.

However, the foregoing prior art methods have the following problems. One problem is that because of a hierarchical tree displayed in one window, when the user intends to hide a sub-concept with the hiding function, the tree expands as the user traces down the tree, making it difficult to grasp the whole tree and find the intended concept. Another problem is that in searching for a sub-concept by way of several intermediate concepts, the user is obliged to repeat the operations in such a manner of displaying sub-concepts located immediately below one concept and selecting one, and displaying sub-concepts located immediately below the selected concept and selecting one, and so on. In this case, if the user takes a wrong path, the hierarchical tree becomes intricate and the search operation has to be retried from the beginning. Still another problem is that although super-concepts seen from one concept up to the superlative concept "UNIVERSAL" can be listed, the user who intends to view appositive concepts of one super-concept needs to select each super-concept and list sub-concepts located immediately below it. On this account, it is difficult for the user to grasp the taxonomic system and find the position of definition of concepts.

It is possible for a knowledge base to preserve queries in the form of macros, as proposed in U.S. patent application Ser. No. 07/430,241 entitled "SYSTEM FOR DISPLAYING CONCEPT NETWORKS". However, since these macrowise queries are stored in a file different from that used by the knowledge base in display, the user is obliged to reference to the file and open the window again.

The foregoing prior art systems are merely capable of displaying hierarchical trees of hierarchical structures that are defined in terms of the is-a relation, disallowing the display in classified forms adapted to individual users. Although the prior art systems can display the instance relation to one concept in the form of a frame or can list instance relations between one generic concept and its sub-concepts, these systems are merely capable of displaying hierarchical trees of hierarchical structures that have been defined in advance in terms of the is-a relation. On this account, when the user intends to search for companies through the classification based on the seat, for example, the system can possibly offer only a display of companies that are classified based on the industrial category.

Prior art methods for displaying an appropriate window on the display screen through the operation of nodes are as follows.

A publication "Macintosh user's guide for desktop Macintosh computers" published by Apple Japan, Inc. has the following description in the sections "How to use view menu" (p. 120) and "Displaying hierarchy in a folder" (p. 238): "By single-clicking the triangular mark on the left of the folder icon, files or low-order folders below the folder are displayed. (Icons of files are different depending on each application that have created the files.) By double-clicking the folder icon (or clicking it and selecting "open . . ." from the menu, another window is displayed and files or low-order folders below the folder are displayed". Another section "open outward folder" (p. 238) describes: "By selecting the title of window of a folder, high-order folders above the folder are displayed."

A publication "Microsoft Windows Version 3.1 Getting Started with Microsoft Windows For Microsoft Windows Operating System Gateway 2000 Edition" has the following description in the section "File Manager" (pp. 37–43): "Directory names and associated directory icons are displayed in the form of a hierarchical tree. By specifying a directory in the tree, files or sub-directories under that directory are listed. (Icons of files are different depending on each application that have created the files.)"

In the foregoing prior art systems, when the user intends to display items that are always within the scope of one's concern, the user is obliged to trace menus from the superlative concept (node), carry out the character string matching operation, and repeat the same operation in every time. Items of user's concern are scattered among unnecessary items, and the user is obliged to scroll the window or switch the window frequently. Reserved queries and glossaries are displayed in different windows, and the user is obliged to open and close several windows. Items are displayed solely based on the hierarchical structures that are provided for the database (knowledge base), and the user cannot choose the taxonomic system that suits the user's purpose.

SUMMARY OF THE INVENTION

The present invention is intended to solve the foregoing prior art problems, and its prime object is to provide a method and apparatus for displaying collectively items of information with which each user is concerned and displaying a hierarchical tree of items through a single user's operation.

Another object of this invention is to provide an information management method and apparatus capable of treating queries, glossaries and images in a unified manner based on a single hierarchical structure.

Still another object of this invention is to provide an information display method and apparatus capable of revising a displayed hierarchical tree of information to meet the user's intention.

In order to achieve the above objectives, the method and apparatus of this invention, which is intended to enable the user to browse through displayed items organized in a hierarchical structure, are designed to collect a certain subset of items (nodes) from a set of items on a hierarchical tree to form a partial hierarchical tree that is represented by a representative node and display such representative nodes in the form of a hierarchical tree.

This invention is applicable to any set of items that is treated in a hierarchical structure. Examples of application include a computer file or data system organized in a hierarchical structure, and a concept network consisting of concepts having the is-a relation with each other.

According to this invention for displaying the hierarchical structure of numerous concepts (data) by use of a multi-window function for example, a partial hierarchical tree with which the user is concerned is treated as a set and it is listed or displayed as a hierarchical tree in a different window so that only the fields of the user's concern are displayed collectively. Glossaries, which are used to deal with character strings of concepts, queries and images are treated, displayed and manipulated based on the hierarchical structure. Attributes of each concepts (data) are saved so that concepts (data) can be displayed by being classified based on attributes selected by the user.

The inventive method and apparatus are designed to mark a node (concept and data) of user's concern on the hierarchical tree, save information of a partial hierarchical tree of the displayed node, and display the node in a separate window. At the next event of information retrieval, the system lets the user select a node among the collected nodes of user's concern thereby to pop up a window for displaying the reserved partial hierarchical tree of that node. Since the collected nodes of user's concern and information of partial hierarchical trees of these nodes are saved, the same hierarchical tree as of the preceding session can be displayed in the next occasion.

Each query or glossary is treated as a node in the same hierarchical structure, and each image is reserved as an additional item of a node. Queries, glossaries and images may be displayed as visual nodes so that they can be distinguished from other nodes.

An attribute information pertinent to a concept (data) is reserved in terms of a generic relation that links two generic concepts and an instance relation that links two instance concepts corresponding to that generic relation. In consequence, it is possible to classify concepts based on the instance relation corresponding to the generic relation selected by the user. A resulting classified tree is treated as a node in the same hierarchical structure together with the representative node of user's concern.

This invention introduces the idea of the conceptual representative node in which a partial hierarchical tree of concepts (data) is treated as a set, and consequently it is possible to gather partial hierarchical trees of user's concern. Consequently, the user can easily search for an intended concept by browsing through fields of user's concern.

The inventive method and apparatus are capable of classifying concepts (data) not only based on the is-a relation defined in advance, but also based on a relation (attribute) appended to them, allowing the user to alter the hierarchical tree to meet the user's intention.

The inventive method and apparatus allow the user to add user-oriented trees and queries to a hierarchical tree of concepts (data), and consequently the user can treat, search and display these items in a unified manner.

BRIEF DESCRIPTION OF THE DRAWINGS

FIG. 5 is a diagram showing a record of information of concepts;

FIG. 6 is a diagram showing a record of the hierarchicay structure of concepts;

FIG. 7 is a diagram showing a record of information of relations (attributes);

FIG. 8 is a diagram showing a record of generic relations and instance relations;

FIG. 9 is a diagram showing a record of concepts and images in pairs;

FIG. 10 is a diagram showing a record of concepts and glossaries in pairs;

FIG. 28 is a diagram showing an example of display off the axis setting window;

DESCRIPTION OF THE PREFERRED EMBODIMENT

An embodiment of this invention will be described with reference to the drawings.

Figure 4:
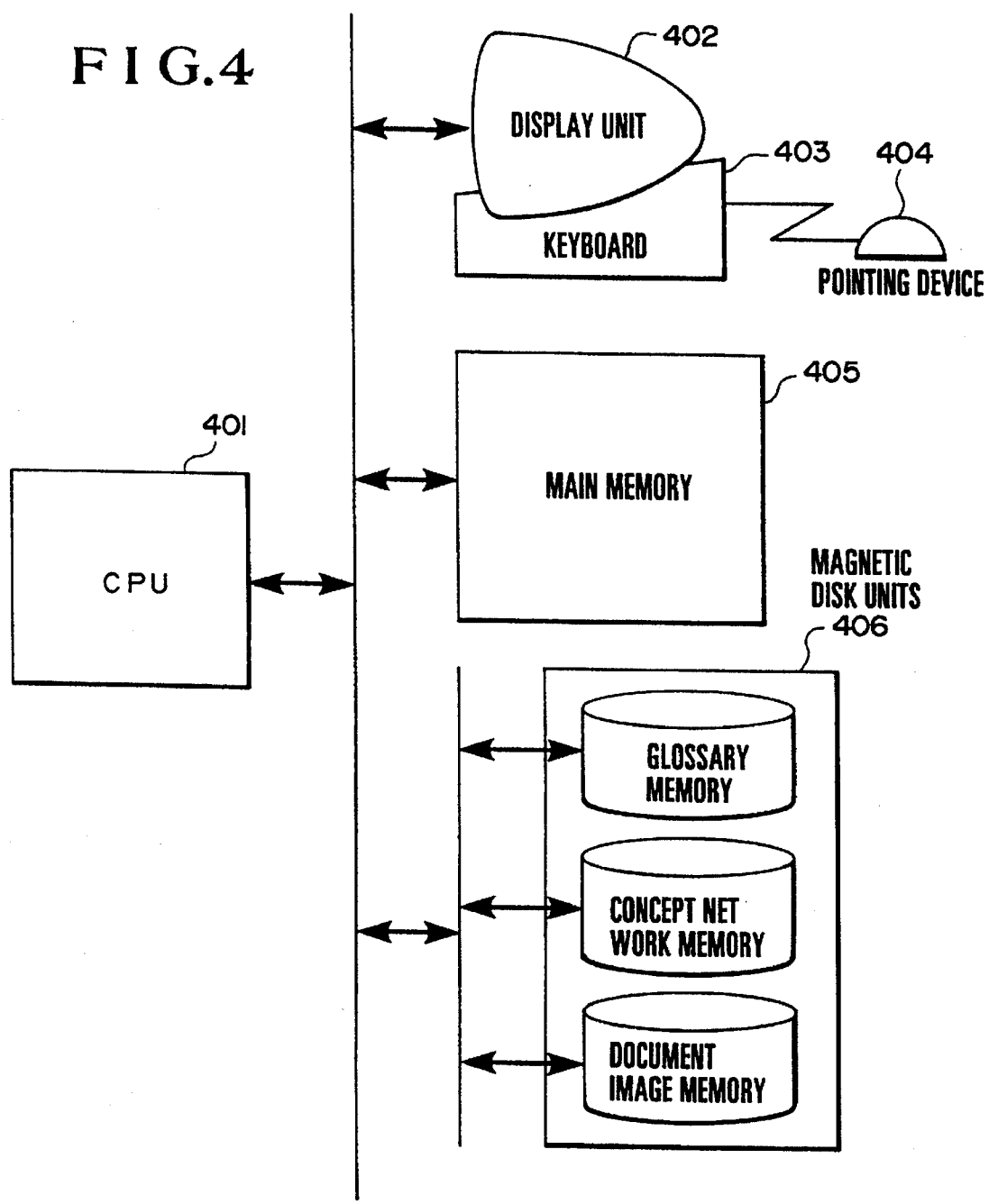
FIG. 4 is a diagram showing the system configuration of this embodiment.

FIG. 4 shows the system configuration of a filing system to which the information display method and apparatus based on an embodiment of this invention is applied. The system includes a CPU 401, a main memory 405, a group of magnetic disk units 406, a display unit 402, a keyboard 403, and a pointing device 404. The system is designed to enter semantic information to a knowledge base and retrieve information from it for display. The knowledge base stored in the magnetic disk units 406 is loaded into the main memory 405. The user makes access to the knowledge base through the operation of the display unit 402, keyboard 403 and pointing device 404, and the system displays requested knowledge in a form specified by the user on the display unit 402. The inventive method and apparatus are used in the system in displaying retrieved knowledge.

Figure 3:
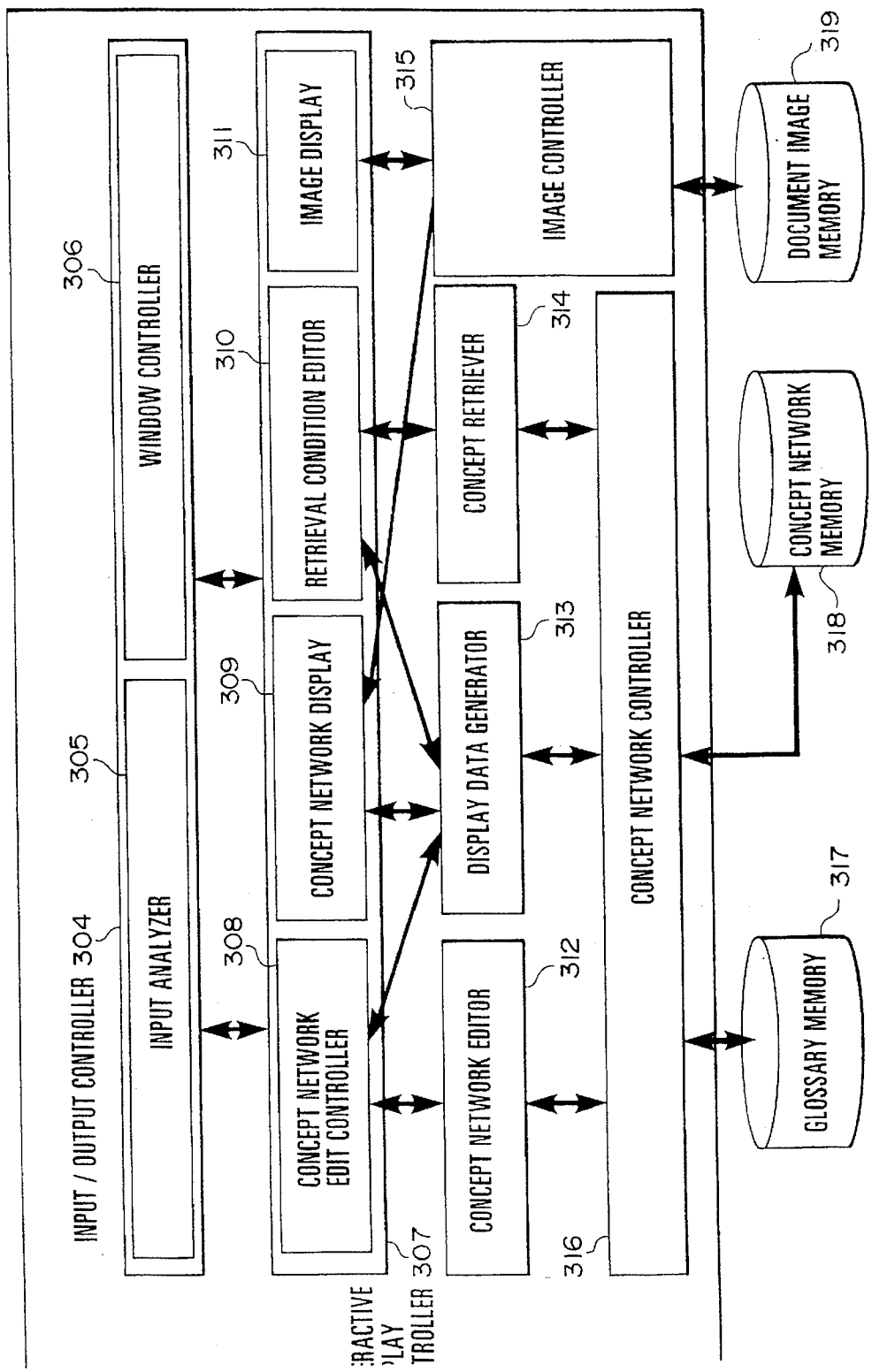
FIG. 3 is a diagram showing the software module organization of the information system based on this embodiment.

FIG. 3 shows part of the software module organization of the knowledge base system that uses the concept network based on this embodiment. The system performs the information retrieval and display in response to the user's request and also the storing and accumulation of fragmentary information, which is entered by the user, in the knowledge base 318 that is formed of the concept network.

Figure 2:
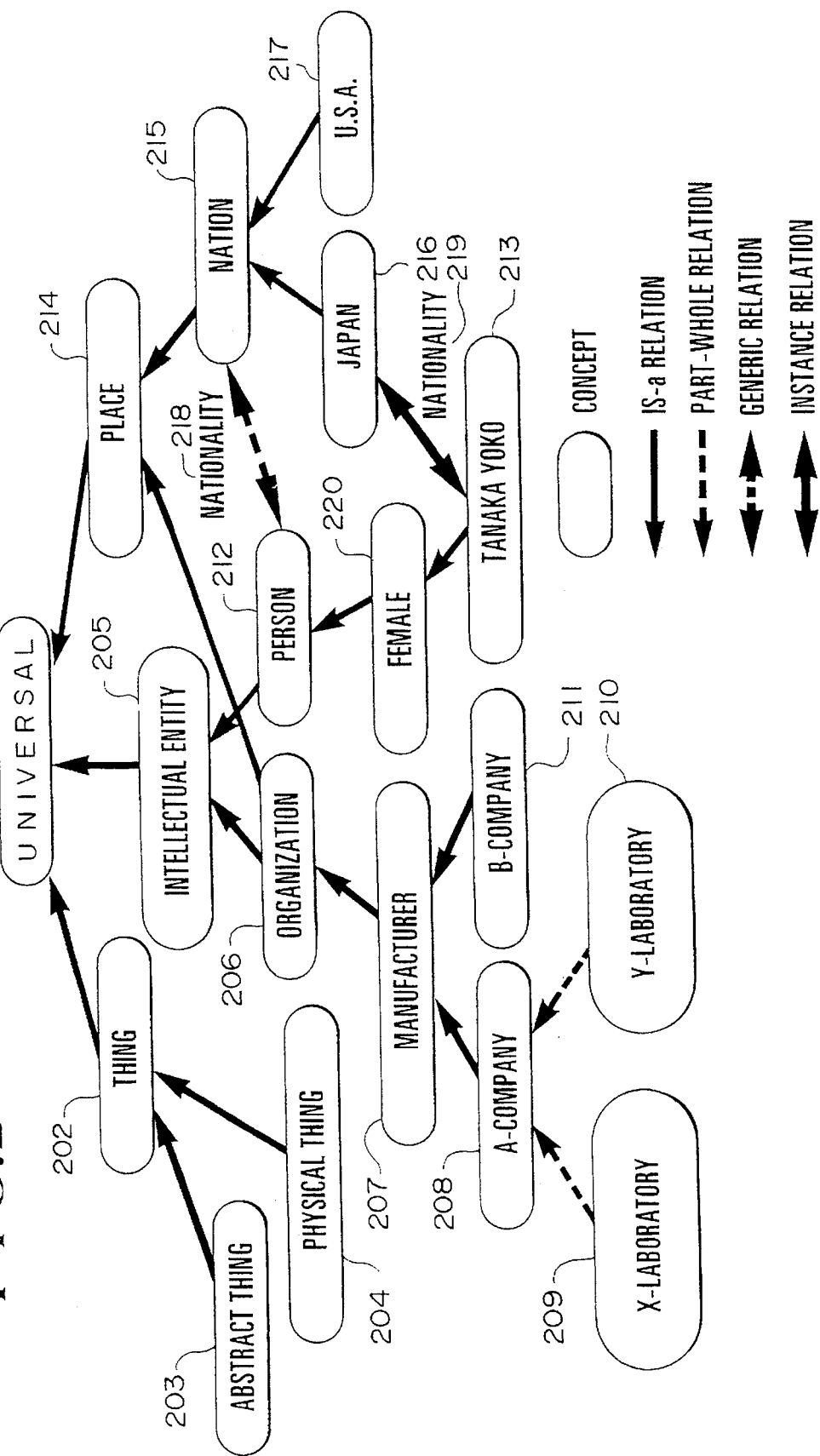
FIG. 2 is a diagram showing an example of the knowledge expression based on this invention.

A concept network memory 318 stores concept network data that is expressed in compliance with the knowledge expression model shown in FIG. 2. Stored data can be expressed in the text format that is compatible with external systems. Stored data is loaded into the memory of a concept network manager 316 at the start-up of the system by being converted to have an internal data structure that enables high-speed browsing. The concept network data of the internal data structure is accessed by a concept network editor 312, view generator 313 and concept retriever 314, and is rendered in the process so that it is useful for the edit, display and search of knowledge (concept network).

A glossary memory 317 stores character strings of concepts that are divided into several files on disks. Stored data is loaded into the memory of the concept network manager 316 in response to a request from the view generator 313. A document image memory 319 stores images of documents.

An input/output control part 304, which consists of a window controller 306 and input analyzer 305, controls the interactive operation with the user. The input analyzer 305 analyzes input information from the keyboard and mouse device through the process of an interactive display control part 307, which consists of a concept network edit controller 308, a concept network viewer 309, a query editor 310 and an image viewer 311.

FIG. 5 through FIG. 10 show the internal data structure of the concept network data in the files of this system. Shown in FIG. 5 through FIG. 8 resemble the internal data structure described in the above-mentioned U.S. Pat. No. 4,868,733. Specific data shown in FIG. 5 through FIG. 10 (not all data are shown) correspond to the data that represent the concept network shown in FIG. 2.

Shown in FIG. 5 is a correspondence table between node IDs (concept IDs) and node names (concept names). The table includes a C# field for the node ID, a CNAME field for the node name, and a P/S field for the flag indicative of whether or not the node name is to be displayed. The P/S flag is used to specify a node name to be displayed when same concepts have more than one name. This table differs from the counterpart of the U.S. Pat. No. 4,868,733 in the addition of a C/Q/T field. In this field, a C flag indicates that the node ID is a concept ID, a Q flag indicates that the node ID is a query ID, and a T flag indicates that the node ID is a classification ID. For example, the node ID "1" has a concept name of "UNIVERSAL", and the node ID "5" has two node names "person" and "human" and a P/S flag "P" indicative of the concept name "person" to be displayed. The node ID "4" has a C/Q/T flag "Q" indicative of a query ID having a name of "article of information retrieval system", and the node ID "8" has a C/Q/T flag "T" indicative of a classification ID having a name of "company classified by seat".

Figure 6:
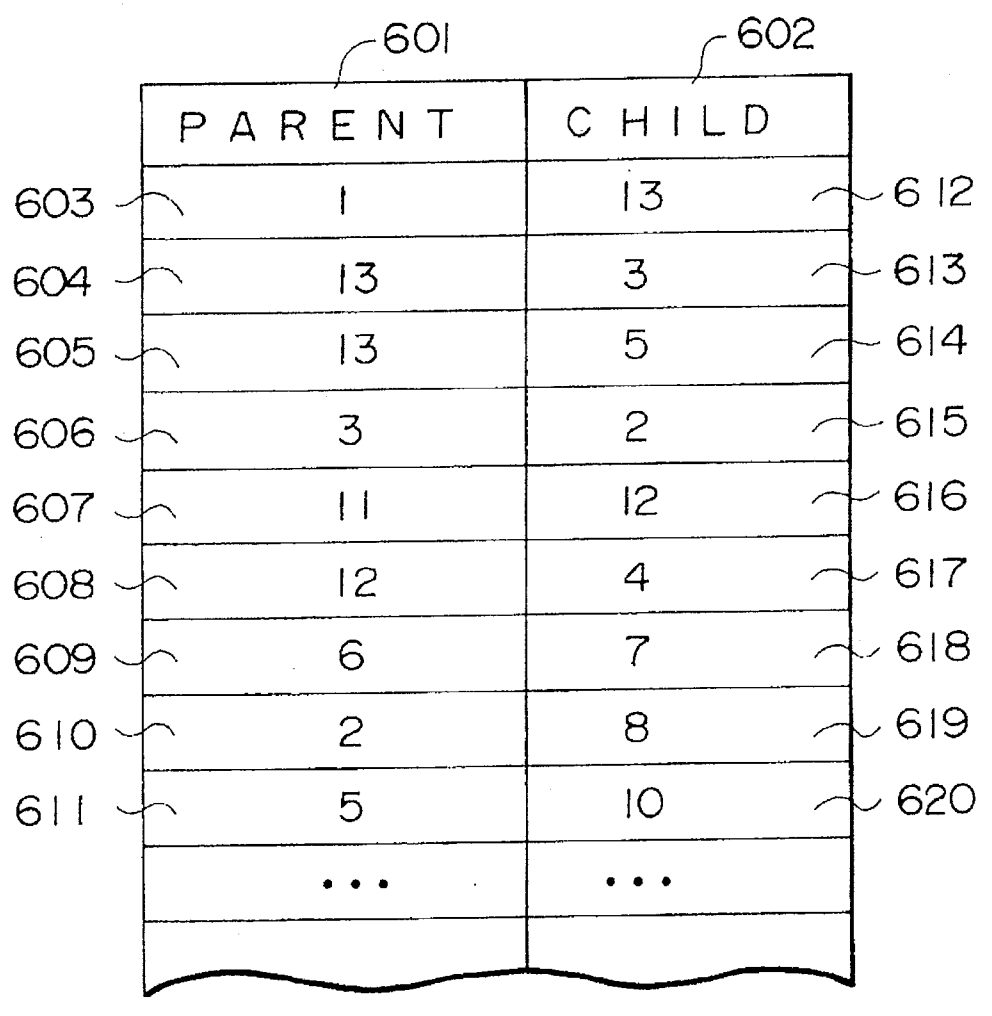

FIG. 6 is a table indicating the rank of concepts in the is-a relation. The table includes a PARENT field for entering a concept ID that indicates a super-concept, i.e., parent concept, in the is-a relation, and a CHILD field for entering a concept ID that indicates a sub-concept, i.e., child concept, in the is-a relation. For example, the concept "organization" of concept ID "3" has a parent concept that is concept "intellectual entity" of concept ID "13".

FIG. 7 is a table containing names of relations that appear in the concept network. The table includes a RS# field that indicates the ID of relation name, a RSNAME field that contains a relation name, a LR field that contains a character string indicative of the relation between two concepts seen from one concept as the subject, and a RL field that contains a character string indicative of the relation seen from the other concept. For example, RS# ID "7" has a relation name "nationality" and two character strings "is nationality of" and "nationality is" indicative of the relation.

FIG. 8 is a table for accumulating generic relations and instance relations that have been defined. The table includes a R# field for entering a relation ID, a RS# field for entering a relation name ID defined in the table of FIG. 7, a CL field for entering a concept ID of the subject concept when the character string defined in the LR field of the table of FIG. 7 is used, a CR field for entering a concept ID of the subject concept when the character string defined in the RL field of the table of FIG. 7 is used, and a G/I field for entering a flag G indicative of a generic relation or a flag I indicative of an instance relation. For example, relation ID "12" is for the relation named by relation name ID "7" and is a generic relation (flag G) between concept "5" and concept "6". In the table of FIG. 7, the two character strings in the LR and RL fields at the relation name ID "7", i.e., "nationality is" and "is nationality of", are obtained. As another example, relation ID "18" is for the relation named by relation name ID "7" and is an instance relation (flag I) between concept "10" and concept "7". Specifically this relation ID defines the instance relation accompanied by two statements "the nationality of Tanaka Yoko is Japan" and "Tanaka Yoko has a nationality of Japan". Part-whole relations are treated as special cases of generic relations in the tables of FIG. 7 and FIG. 8.

FIG. 9 is a table for containing concept IDs and image IDs, indicating whether or not an image of each concept is defined.

FIG. 10 is a table for containing concept IDs and glossary IDs, indicating whether or not a glossary of each concept is defined. Glossaries are stored in the form of the S-expression of LISP. For example, a concept ID "3" for "organization" defines a glossary of "4". Glossaries are defined as character strings that can be sub-concepts of the "organization" in the form of LISP-based expression such as:

(G#4 ("XX group", "ABC electric company", "XYZ bank"))

It is also possible to define a character string among glossaries as a concept in the tables of FIG. 5 and FIG. 6. In this case, the concept ID is attached to it automatically. For example, when a character string "XYZ bank" is specified, it is defined as a concept in the table of FIG. 5, with a new concept ID being affixed to it. This glossary is also defined in the table of FIG. 6 as a sub-concept of the concept which the glossary belongs, i.e., "organization" at C#="3", as a default option. The user can alter this parent concept "organization" to other concept such as "bank".

Queries having individual IDs are stored in the form of S-expression of LISP. For example, a query representative node "company that published information retrieval system" is described by the S-expression in terms of IDs of:

("company that published a information retrieval system" ("company" ("published document" ("article of information retrieval system"))

for query expression Q#4:

```
Query expression: company
    "article of information retrieval system" that
is a published document of the company
as follows.
    S-expression: (Q#4 (C#2
                        (R#17 (Q#2))
```

The above query expression Q#4 includes a query expression Q#2 that represents "article of information retrieval system", and the query expression Q#2 is:

```
Query expression: article
    information retrieval system that is the
subject of the article
```

This is described in terms of IDs of:

```
("article of information retrieval system"
    ("article"
        ("subject" ("information retrieval
                    system"))
``` as follows:

```
S-expression: (Q#2 (C#12
                    (R#23 (C#9))
```

Classified trees having individual IDs are stored in the form of S-expression of LISP. For example, a classification tree "company classified by seat and industry" with the intention of classifying companies by seat, i.e., Japan, U.S.A., Britain and other, and by industry, i.e., manufacturer, bank, service firm and other, is described in terms of IDs of:

```
("company classified by seat and industry"
    (company (seat (concept-flag Japan U.S.A.
                    Britain))
            (industry (concept-flag manufac-
                    turer bank service-firm)))
``` as follows:

```
(C#53
    (C#2 (R#28 (C C#7 C#42 C#43))
        (R#33 (C C#66 C#67 C#68))))
```

A classified tree "employee of company classified by seat" is displayed as a combination of companies classified by seat and employees who are employed by individual companies. This classified tree is described in terms of IDs of:

```
("employee of company classified by seat"
    (company (seat (concept-flag Japan U.S.A.
                    Britain))
            (industry concept-flag manufacturer
                    bank service-firm)))
            (employee))
``` as follows:

```
(C#54
    (C#2 (R#28 (C C#7 C#42 C#43))
        (R#33 (C C#66 C#67 C#68)))
    (R#55))
```

The concept flag C indicates that the classification is based on the concept.

A classified tree "capital" with the intention of classifying capitals in the range 0–100 M-yen in a step of 50 M-yen is described in terms of IDs of:

```
("employee of company classified by seat"
    (company (capital (numeric-flag 0 100
                        50))))
``` as follows:

```
(C#55
    (C#2 (R#29 (S 0 100 50))))
```

The numeric flag S indicates that the classification is based on the numeric value.

As described above, queries and classified trees defined by the user are stored in the form of S-expression of LISP and displayed in the form of a tree through the analysis of the S-expression. For example, classified trees are accumulated only for their classification manners in terms of the S-expression as explained above, and a classified tree is retrieved by another search in response to the user's request of tree-wise display.

Next, the data structure for display will be explained. In addition to the internal data of the system described above, tree structures that have been used by individual users are stored in the form of S-expression as follows.

```
(user ID
    (1 "UNIVERSAL"
        (1 "person"
        (1 "organization"
            (1 "university")
        (1 "document"
            (1 "patent" . . .)
            (0 "monograph" (0 "domestic paper"
                . . .) (0 "foreign "paper" . . .))
            (0 "article" . . .)
            . . . .)))
```

Numeral "1" indicates that a concept is defined as a conceptual representative node, and numeral "0" indicates that a concept is not defined as a conceptual representative node. Tree-wise display data used by individual users are reserved in the form of S-expression explained above.

Next, the display operation of a hierarchical tree of concepts based on this embodiment will be explained. Initially, the operation of this system will be explained with reference to the display screen of interactive operation shown in FIG. 1.

Figure 11:
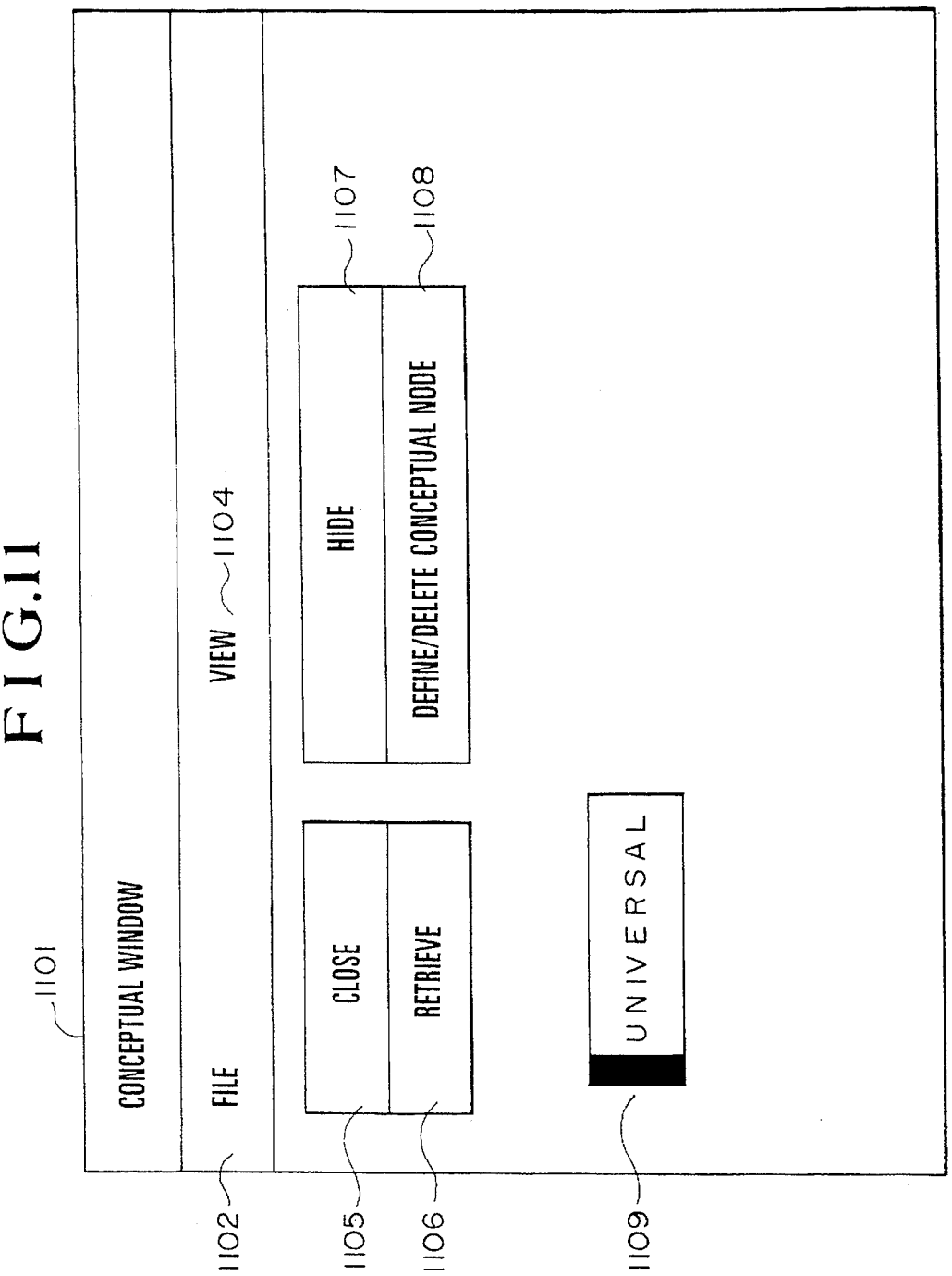
FIG. 11 is a diagram showing the initial menu.

The screen of interactive operation displays several windows at once. Among many kinds of windows, a basic window that is always present on the screen is a conceptual window 101. A sub-conceptual window 102 and classification window 103 appear in response to certain user's actions. The detail of each window is shown in FIG. 11 and successive figures.

Next, the display operation implemented by the concept network viewer 309 shown in FIG. 3 will be explained in brief.

Figure 1:
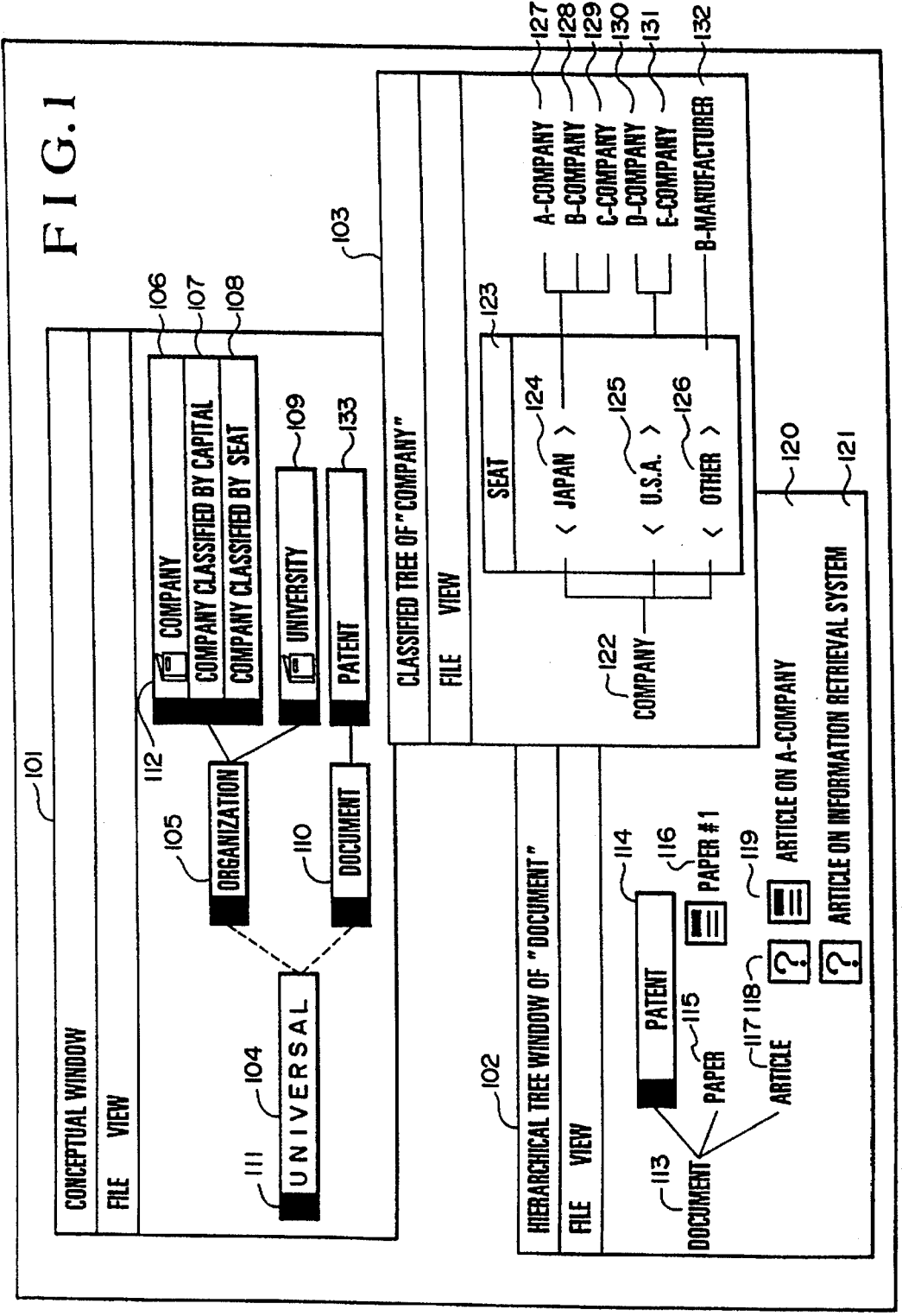
FIG. 1 is a diagram showing an example of the display screen for the interactive operation of the information system based on an embodiment of this invention.

Initially, the conceptual window 101 has a display of hierarchical structure of a concept field, which the user has once browsed, as a set of conceptual representative nodes. A conceptual representative node signifies a concept designated to be of the concept field with which the user is concerned. By setting a conceptual representative node, the user can view the hierarchical structure of the concept field in concern (hierarchical tree below that concept) in the conceptual window 101. In FIG. 1, a frame with a bold left edge 111 enclosing a concept indicates that the concept is a conceptual representative node.

A solid line that links two conceptual representative nodes signifies that these concepts are linked with each other directly in the parent-child relation. For example, two conceptual representative nodes "organization" and "university" are linked by the solid line, indicating that there is no other concept existing in the is-a relation between these two nodes. A dashed line that links two conceptual representative nodes signifies that there is one or more concepts existing in the is-a relation between these conceptual representative nodes. For example, between two conceptual representative nodes "UNIVERSAL" and "organization", there exists "intellectual entity" as shown in FIG. 2, and therefore these conceptual representative nodes are linked by the dashed line.

When the user moves the arrow pointer (not shown) on the screen to the conceptual window 101 by means of the mouse device, the window is activated.

Next, when the user selects a character string of concept among those on the concept tree displayed in the window 101, the system pops up a sub-conceptual window 102, with a partial concept tree headed by the selected concept as the superlative concept being displayed in it. In this case, if the user has ever browsed through the partial concept tree of that concept, that tree is retrieved and displayed. For example, if the user selects a conceptual representative node "document", the system pops up a sub-conceptual window 102 for displaying sub-concepts of the "document" and displays the concept field that the user has ever browsed, as shown in FIG. 1.

Next, when the user clicks the mouse to select a conceptual representative node "patent" located below the "document" in the window 102, the system will pop up another sub-conceptual window for displaying sub-concepts below the "patent".

It is possible for the user to edit the display of sub-concepts below the "document" in the window 102. After the edit operation, when the user closes the window 102 and selects the conceptual representative node "document" again in the window 101, the edited tree of sub-concepts will be displayed.

A visual node 118 in the window 102 indicates that the node is a query representative node "A-company related article". This system enables the user to name each query so that it can be defined as a node of concept tree. Another visual node 119 indicates that image information is appended to the concept. Image information is generally defined in correspondence to a concept, such as "paper #1" 116, but it is also possible to define a set of image information, which is gathered as a result of a search operation, in correspondence to a query representative node, as exemplified by "article related to A-company" 120. A visual node 112 in the window 101 indicates that the concept "company" has the definition of a glossary. A glossary is a character string of a sub-concept of the concept in attention. Accordingly, the user can define a character string as a concept by storing it in the memory when necessary.

This system is capable of defining a taxonomix system of concepts classified based on a user-specified relation (attribute) as a classification representative node on a concept tree of is-a relation. The classification representative node is named by the user, e.g., "company classified by seat".

Concepts "* company classified by capital" 107 and "* company classified by seat" 108 in the window 101 of FIG. 1 are classification representative nodes, as indicated by the mark "*". By selecting the classification representative node 108 defined on the partial hierarchical tree to pop up the classification window 103, the user can view the taxonomix system.

FIG. 1 shows a display after the user has selected a classification representative node "* company classified by seat" 108 to pop up the classification window 103. In the classification window 103 for the "* company classified by seat", the hierarchical tree is altered by the concept relation (attribute) specified by the user (as compared with the tree of concept network defined originally). Namely, the concept "company" has its sub-concepts divided in terms of the relation "seat" into "Japan", "U.S.A." and "other", as a result of the user's specification of seat-based classification.

It is further possible for the user to alter the concept "company" to a sub-concept so as to view sub-concepts of that sub-concept. For example, when the user alters the concept "company" to "electric manufacturer", sub-concepts of electric manufacturers classified by seat will be displayed automatically. It is also possible to alter the classification by seat to the classification by seat and industry.

The foregoing information display operation will be explained in more detail.

Figure 38:
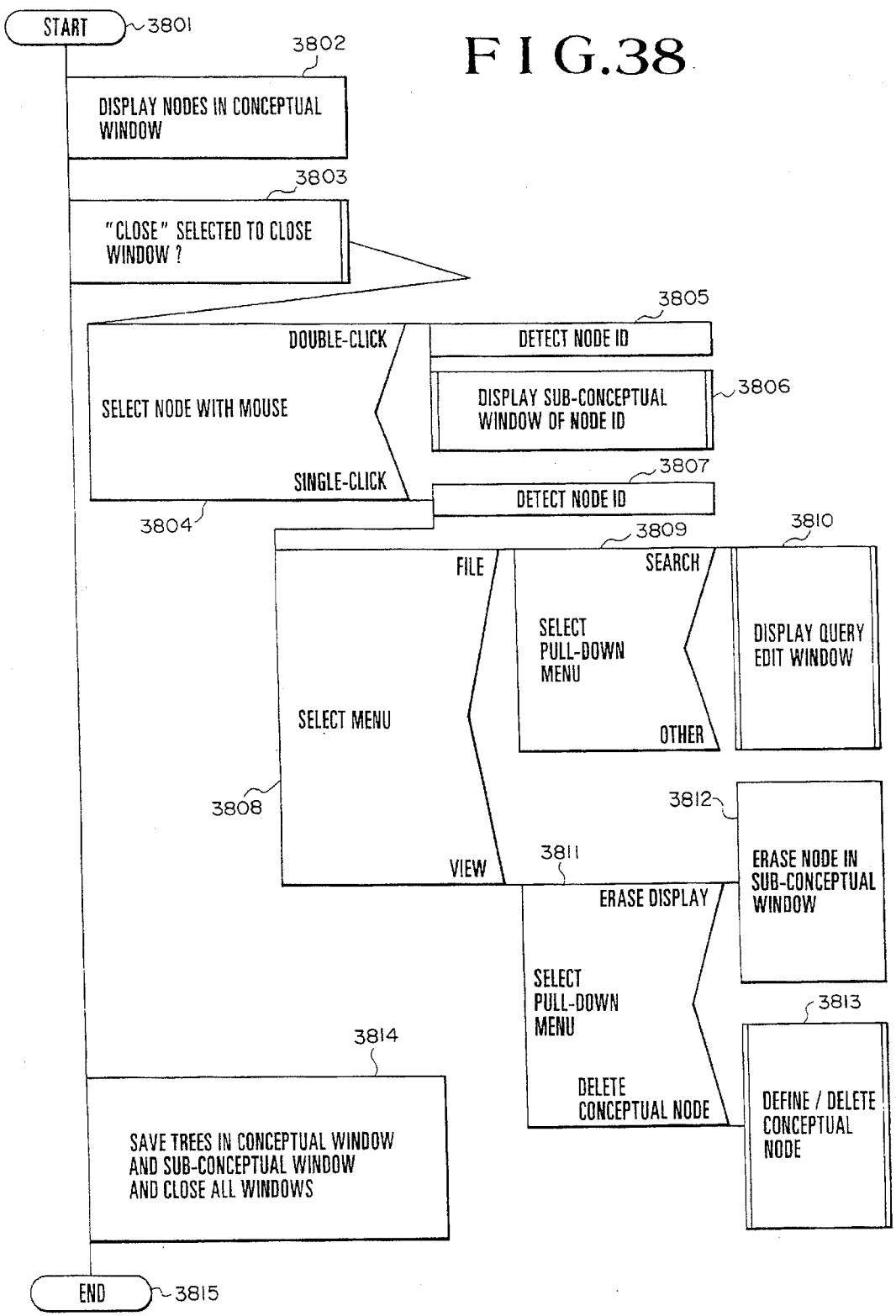
FIG. 38 is a flowchart showing the operation when the user browses through a hierarchical tree.

FIG. 38 is a flowchart showing the hierarchical tree display operation. The operation starts at step 3801, and nodes are displayed in the conceptual window in step 3802. When the user makes access to the system for the first time, only the conceptual node "UNIVERSAL" is displayed. If the user has ever browsed through the knowledge base, the hierarchical tree that was displayed last is displayed.

FIG. 11 shows the initial screen appearing when the user makes access to the system for the first time. The conceptual window 1101 displays only the conceptual node "UNIVERSAL" 1109.

If the user selects "file" 1102 from menu and further selects "close" 1105 from pull-down menu in step 3803, the system saves the hierarchical tree, closes all windows and terminates the operation in step 3814. Otherwise, the following operations of step 3804–3813 take place.

In step 3804, when the user points a node in the conceptual window 1101 and clicks the mouse once, the system detects the node ID in step 3807 and the node is selected. When the user selects "file" from menu in the window in step 3808 and further selects "search" from pull-down menu in step 3809, then the system pops up the query edit window for the selected concept (node) in step 3810. The operation on the query edit window carried out in step 3810 will be explained later with reference to FIG. 43.

When the user selects "view" 1104 from menu in step 3808 and further selects "hide" 1107 from pull-down menu in step 3811, the sub-concepts of the selected concept are erased on the screen in step 3812. If the user selects "delete conceptual node" 1108 in step 3811, the node is deleted from the definition as a conceptual representative node and is erased on the screen in step 3813. The conceptual node define/delete operation carried out in step 3813 will be explained later with reference to FIG. 41.

Figure 12:
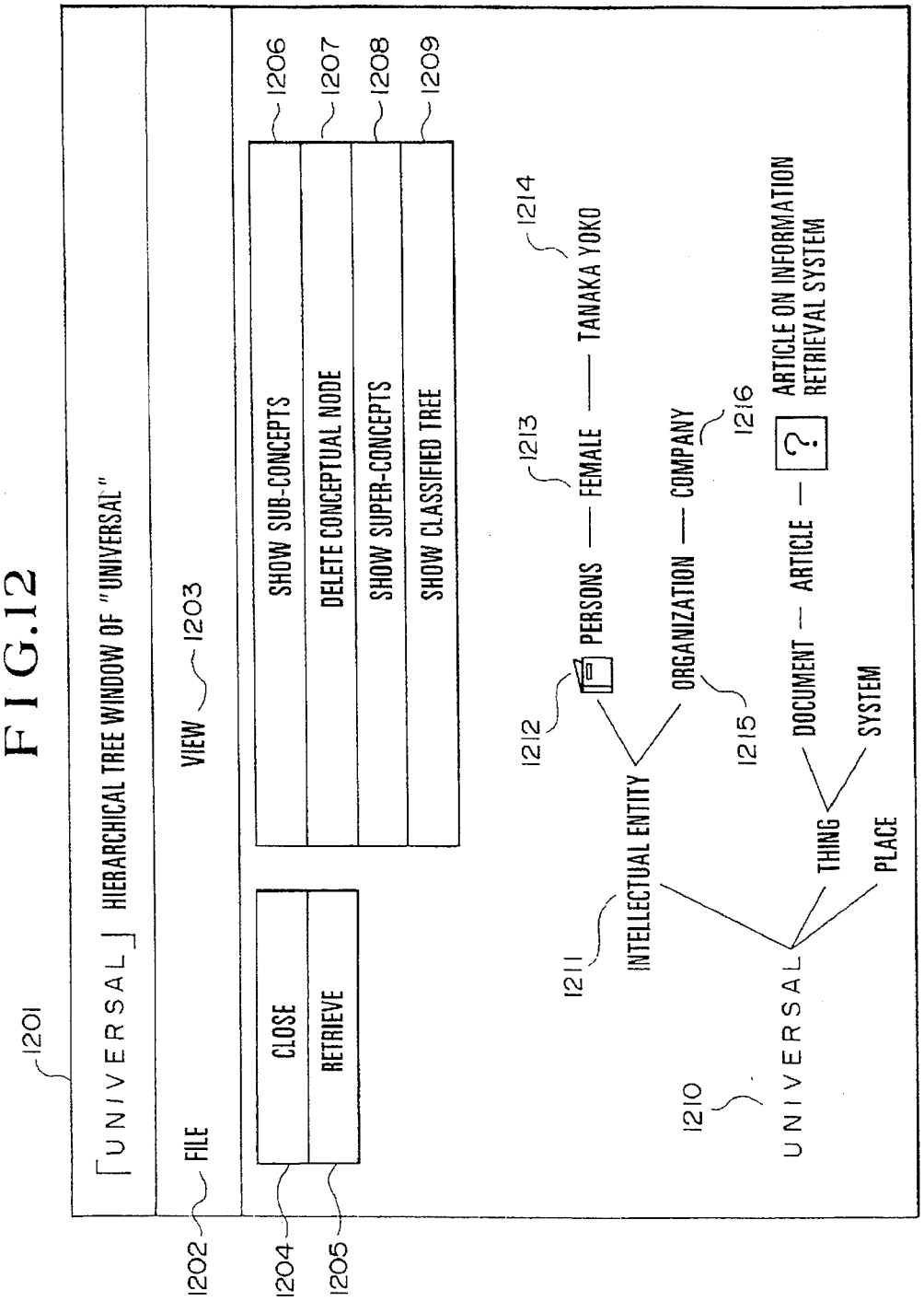
FIG. 12 is a diagram showing a display of the sub-conceptual window including an associated menu.

In step 3804, when the user double-clicks the mouse at a conceptual node displayed in the conceptual window 1101, the system detects the node ID in step 3805 and pops up the sub-conceptual window for the node ID in step 3806. For example, the user double-clicks the mouse at the conceptual node "UNIVERSAL", and the system detects the node ID and pops up the sub-conceptual window for the node ID as shown in FIG. 12. The operation on the sub-conceptual window for the detected node ID carried out in step 3806 will be explained in the following with reference to FIG. 39.

Figure 39:
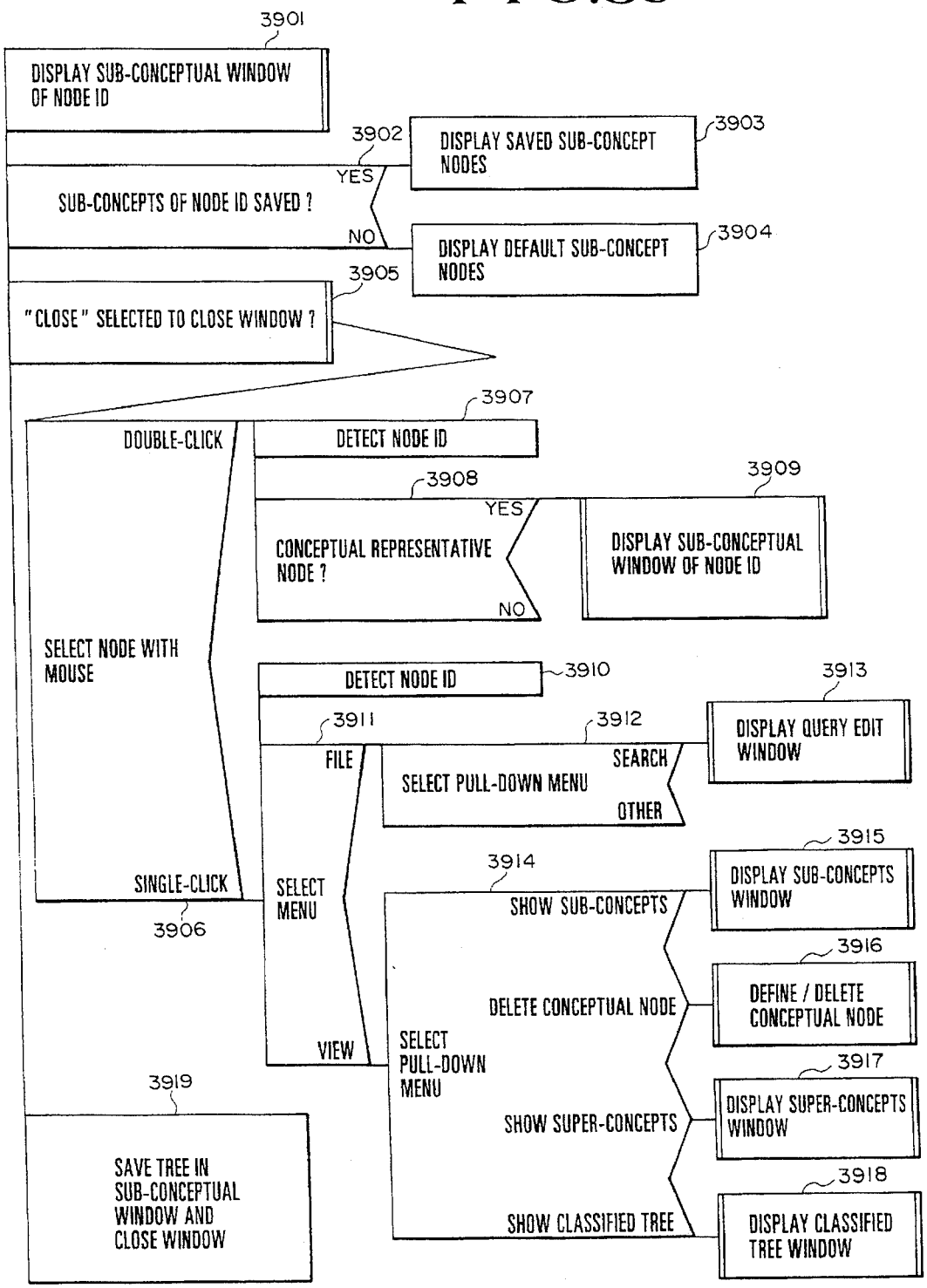
FIG. 39 is a flowchart showing the operation when the user browses through the sub-conceptual window.

The operation on the sub-conceptual window as shown in FIG. 12 will be explained in detail with reference to FIG. 39.

Initially, the system displays the sub-conceptual window for the selected node ID in step 3901. In the next step 3904, the system finds whether or not sub-nodes of the specified node ID are reserved. If sub-nodes are found absent because the user has never accessed to the system, for example, the system displays only "UNIVERSAL" or the default sub-nodes of a certain depth and branches in the window of FIG. 12 in step 3904. In case sub-nodes of the specified node ID are reserved due to a prior browsing, the system retrieves and displays the reserved sub-nodes in step 3903 as shown in FIG. 12.

Next, if the user selects "file" 1202 from menu and further selects "close" 1204 from pull-down menu in step 3905, then the system saves the hierarchical tree, closes the window and terminates the operation on this window in step 3919. Otherwise, the following operations of step 3906–3918 take place.

Figure 21:
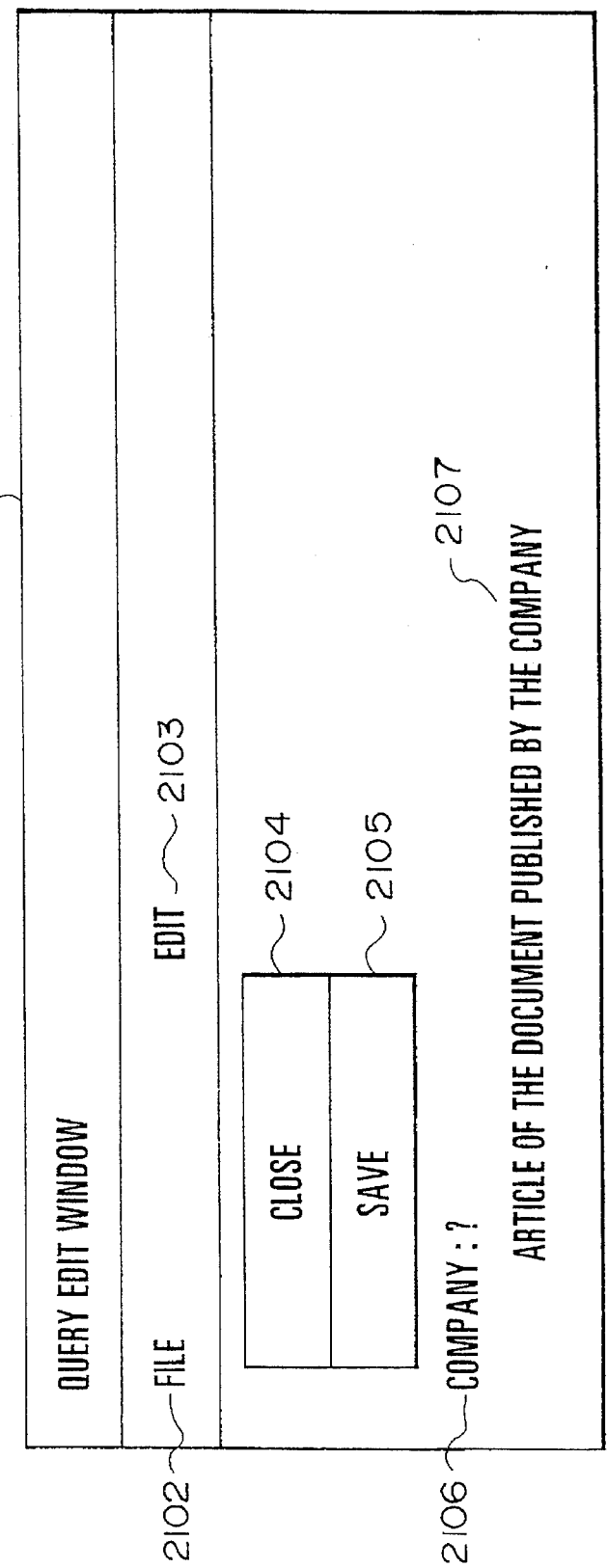
FIG. 21 is a diagram showing an example of display of the query edit window including an associated menu.

In step 3906, the user clicks the mouse at a node in the window 1201. Then, the system detects the node ID and the node is selected in step 3910. Next, if the user selects "file" 1203 from menu in step 3911 and further selects "retrieve" 1205 from pull-down menu in step 3912, then the system displays the query edit window 2101 as shown in FIG. 21 in step 3913. The operation on the query edit window 2101 carried out in step 3913 will be explained later with reference to FIG. 43.

Figure 13:
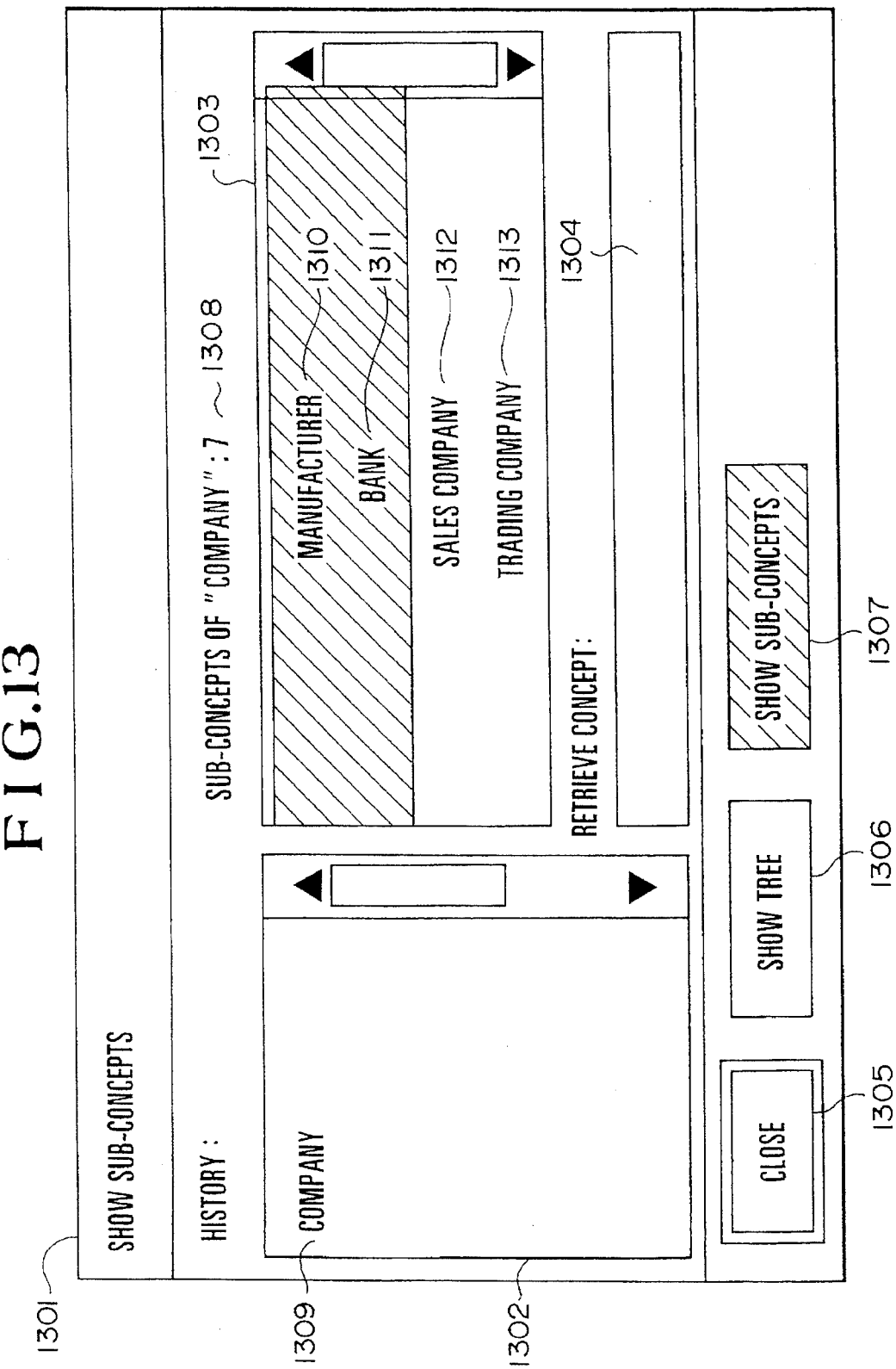
FIG. 13 is a diagram showing an example of display when the sub-concepts window is open.

If the user selects "view" 1203 from menu in step 3911 and further selects "show sub-concepts" 1206 in step 3914, then the system displays a sub-concept window 1301 as shown in FIG. 13 in step 3915. The operation on the sub-conceptual window carried out in step 3915 will be explained later with reference to FIG. 40.

If the user selects "view" 1203 from menu in step 3911 and further selects "define/delete conceptual node" 1207 from pull-down menu in step 3914, then the system implements the define/delete process for the conceptual representative node in step 3916. Namely, if the selected node (that has been detected in step 3910) is a conceptual representative node, it is deleted, or otherwise it is defined as a sub-conceptual representative node. The conceptual node define/delete operation carried out in step 3916 will be explained later with reference to FIG. 41.

Figure 20:
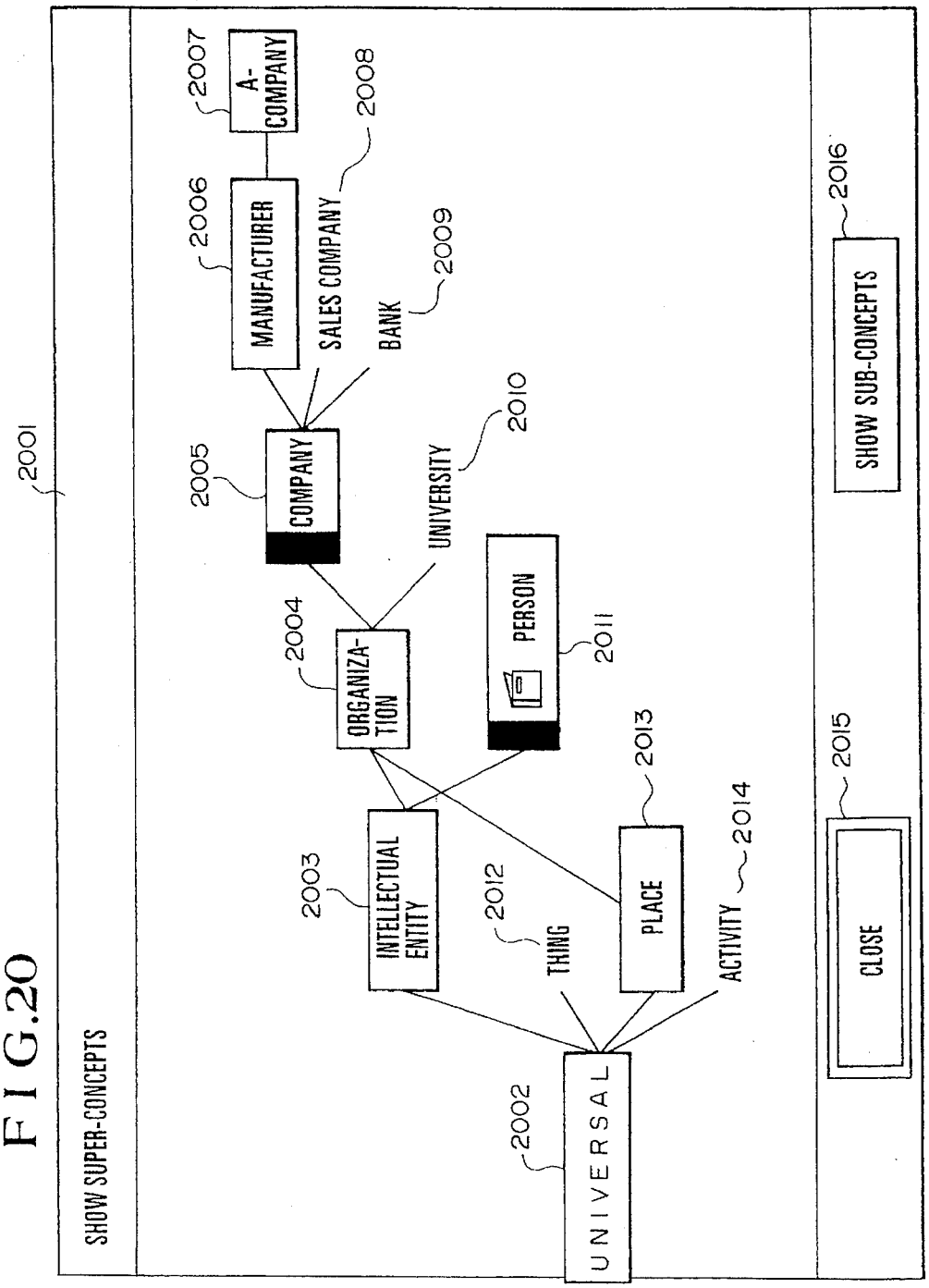
FIG. 20 is a diagram showing an example of display of the super-concepts window.

If the user selects "view" 1203 from menu in step 3911 and further selects "show super-concepts" from pull-down menu in step 3914, then the system displays a super-concepts window 2001 as shown in FIG. 20 in step 3917.

Figure 42:
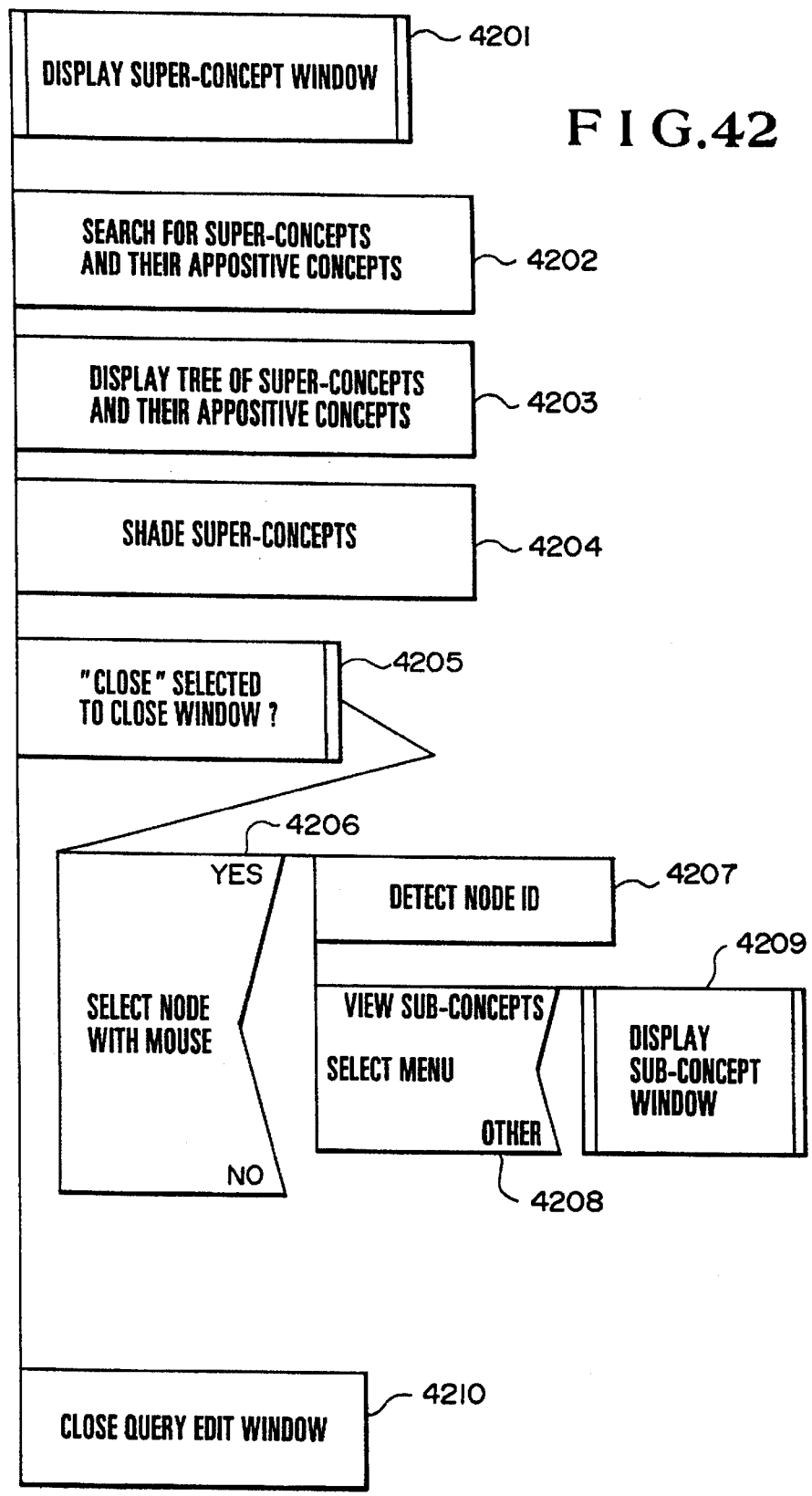
FIG. 42 is a flowchart showing the operation when the user browses through the super-concepts window.

The operation on the super-concepts window carried out in step 3917 will be explained later with reference to FIG. 42.

Figure 24:
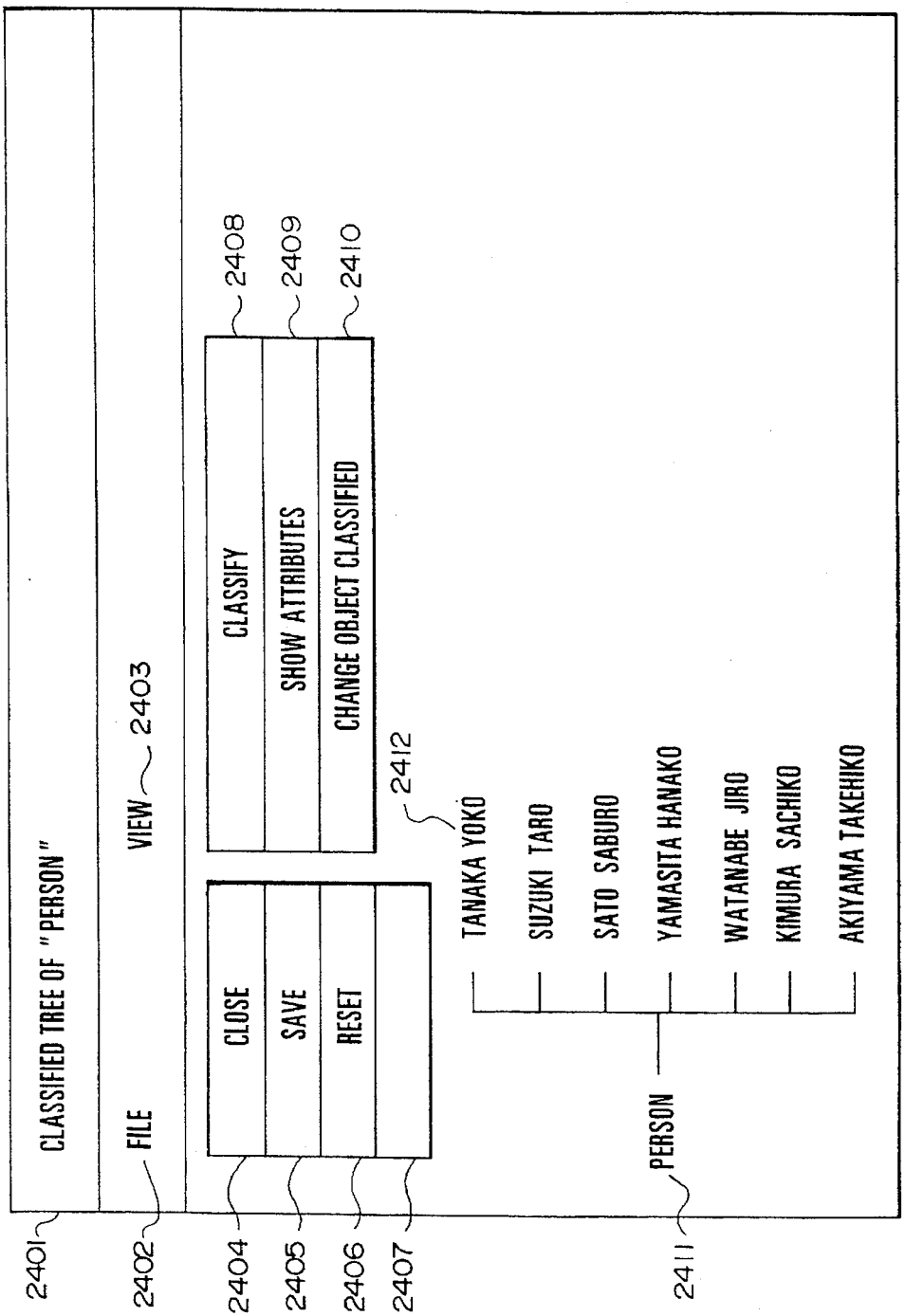
FIG. 24 is a diagram showing an example of display of the classification window including an associated menu.

If the user selects "view" 1203 from menu in step 3911 and further selects "show classified tree" from pull-down menu in step 3914, then the system displays a classification window 2401 as shown in FIG. 24 in step 3918. The operation on the classification window carried out in step 3918 will be explained later with reference to FIG. 44.

When the user double-clicks the mouse at a node in the window 1201 in step 3906, the system detects the node ID and the node is selected in step 3907. In the next step 3908, the system finds whether or not the node is a conceptual representative node. If it is found to be a conceptual representative node, the system displays the sub-conceptual window for the detected node ID in step 3909. The operation of step 3909 is identical to that of FIG. 39 explained above, and they take place in parallel.

Figure 40:
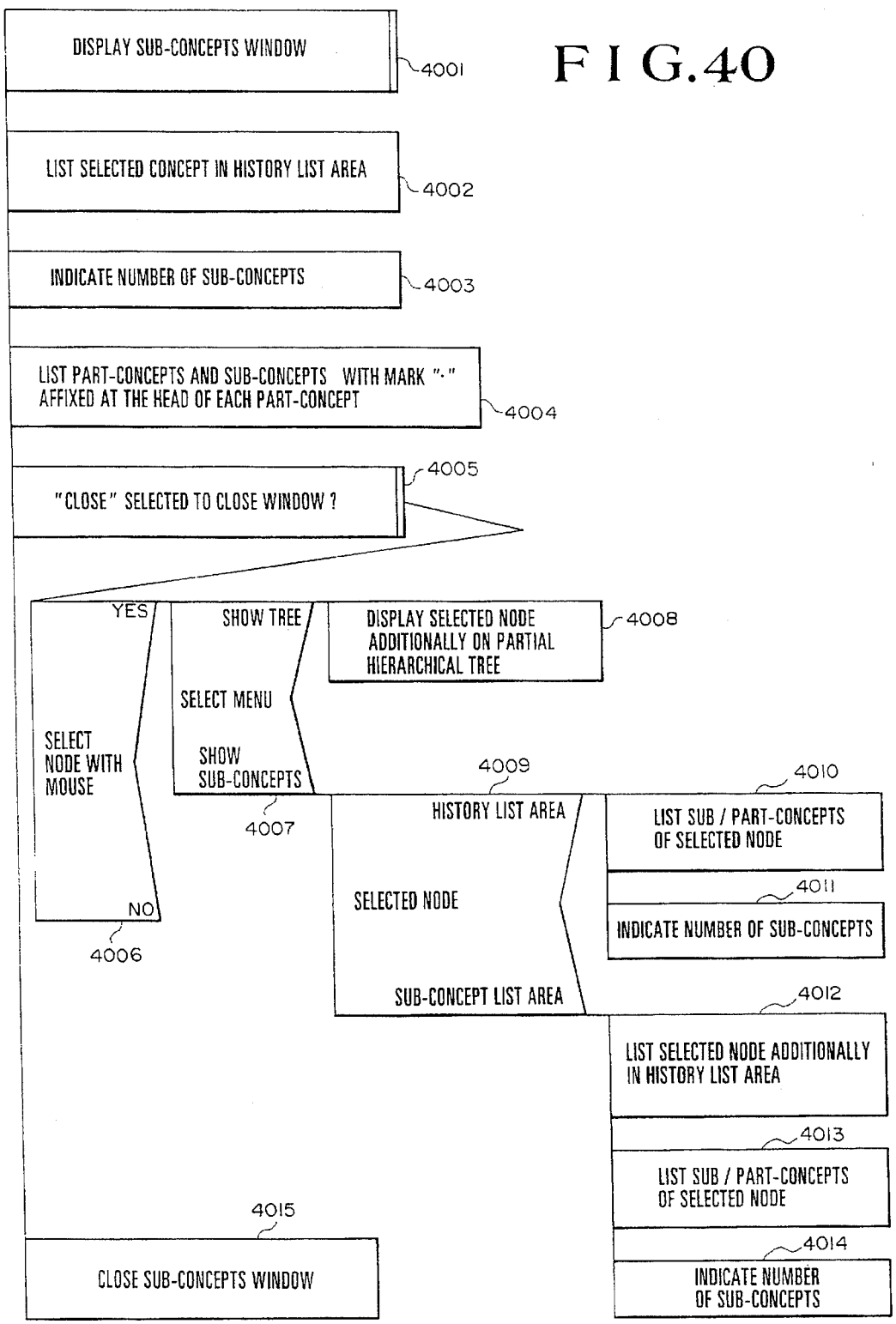
FIG. 40 is a flowchart showing the operation when the user browses through the sub-concepts window.

Next, the operation on the sub-concepts window 1301 will be explained in detail with reference to FIG. 40.

As explained on FIG. 39, when the user selects a node on the sub-conceptual window 1201 as shown in FIG. 12 and further selects "show sub-concepts" 1206 below "view" 1203 of menu, the system displays a sub-concepts window 1301 as shown in FIG. 13. FIG. 13 shows a display after the user has selected a node "company" 1216 in FIG. 12 to open the sub-concepts window 1301.

Initially, the system displays the sub-concepts window 1301 in step 4001 as shown in FIG. 13. In the figure, a history list area 1302 lists the concept "company" 1309 that has been selected by the user to display its sub-concepts. Indicated at the position 1308 next to a title "sub-concepts of company" is the number of sub-concepts of the "company", which is "7" in this example. Sub-concepts and part-concepts of the concept "company" are listed in this example. A search-key input area 1304 is used by the user to enter a character string for searching a sub-concept list area 1303 for concepts based on the character string.

Referring back to FIG. 40, the system displays the selected concept to the history list area 1302 in steps 4002–4004, indicates the number of sub-concepts, and lists the sub-concepts and part-concepts in the sub-concept list area 1303. Among the items listed in the area 1303, part-concepts are marked by "•" at the head of character string.

In the next step 4005, if the user selects "close" 1305 from menu of the window 1301, the system closes the window 1301 and terminates the operation on this window. Otherwise, the following operations of steps 4006–4014 take place.

Initially, the user clicks the mouse at a concept (node) displayed in the sub-concept list area 1303 below the sub-concepts window 1301. In the next step 4007, the system finds whether or not "show sub-concepts" 1307 or "show tree" 1306 from menu of the sub-concepts window 1301 is selected by the user. If "show sub-concepts" is found selected, the system finds in step 4009 as to whether the selected concept (node) is a concept in the history list area 1302 or in the sub-concept list area 1303.

Figure 14:
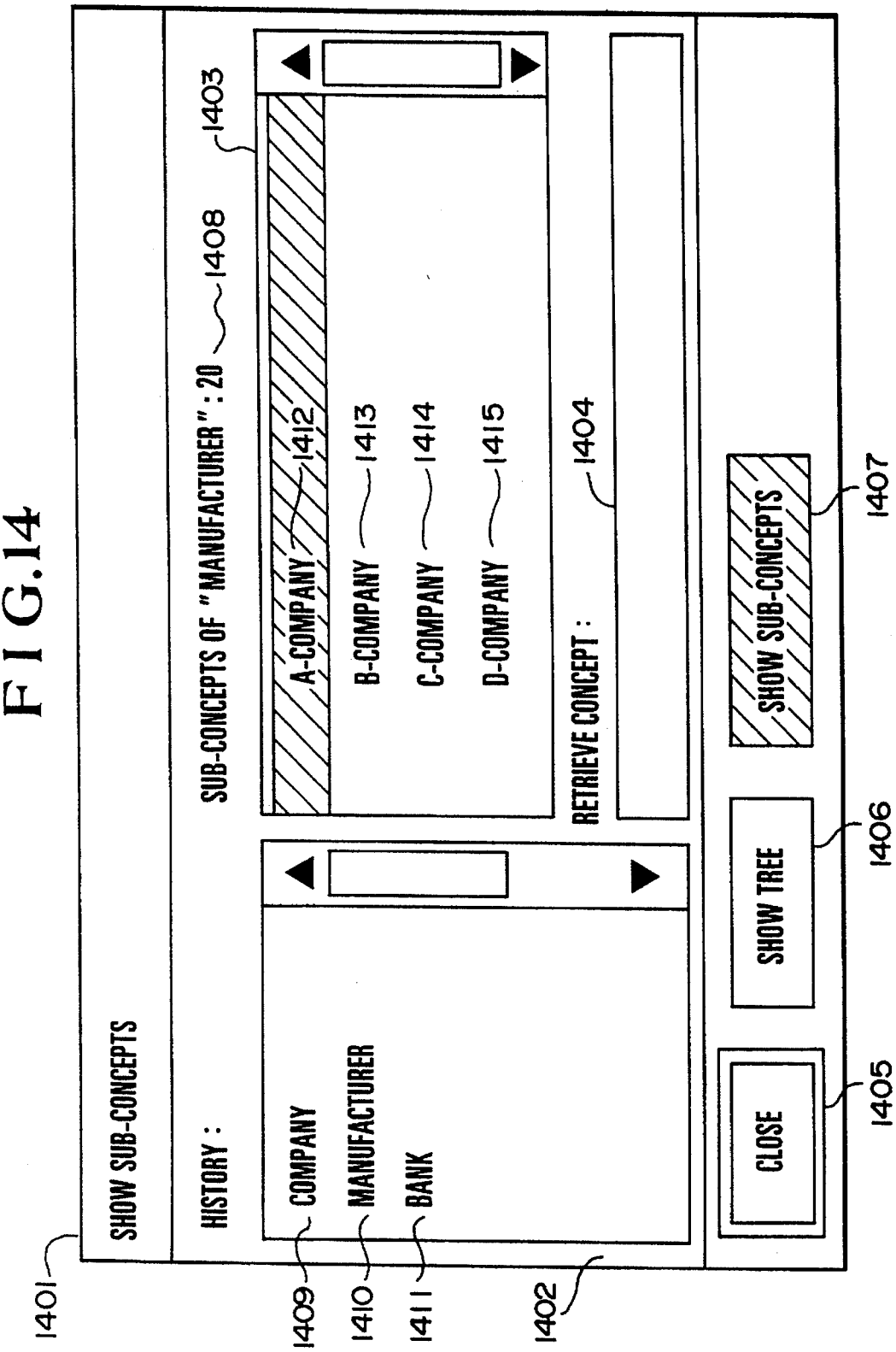
FIG. 14 is a diagram showing an example of display of the sub-concepts window when the user browses through lower sub-concepts.

If the concept selected in step 4009 is a concept in the history list area 1302, the system lists the sub and part-concepts of the selected concept in step 4010 in the sub-concept list area 1303 and indicates the number of sub-concepts in step 4011. If the concept selected in step 4009 is a concept in the sub-concept list area 1303, the system adds the selected concept (node) to the list of the history list area 1302 in step 4012. In the next step 4013, the system lists the sub and part-concepts of the selected concept in step 4010 in the sub-concept list area 1303 and indicates the number of sub-concepts in step 4014. For example, in FIG. 13, when the user selects "manufacturer" 1310 and "bank" 1311 in the sub-concept list 1303 below the "company" and further selects "show sub-concepts" 1307, the sub-concepts window 1301 is revised in steps 4012–4014 as shown in FIG. 14.

In the history list area 1402 in FIG. 14, the selected concept "manufacturer" 1410 and "bank" 1411 are listed additionally below the "company" 1409 by being indented (indicative of sub-concepts of the "company"). The number of concepts is altered to "20" that is the number of sub-concepts of the "manufacturer", and the sub-concepts of the "manufacturer" 1410 that is one of the selected concept are listed in the sub-concept list area 1403.

Figure 15:
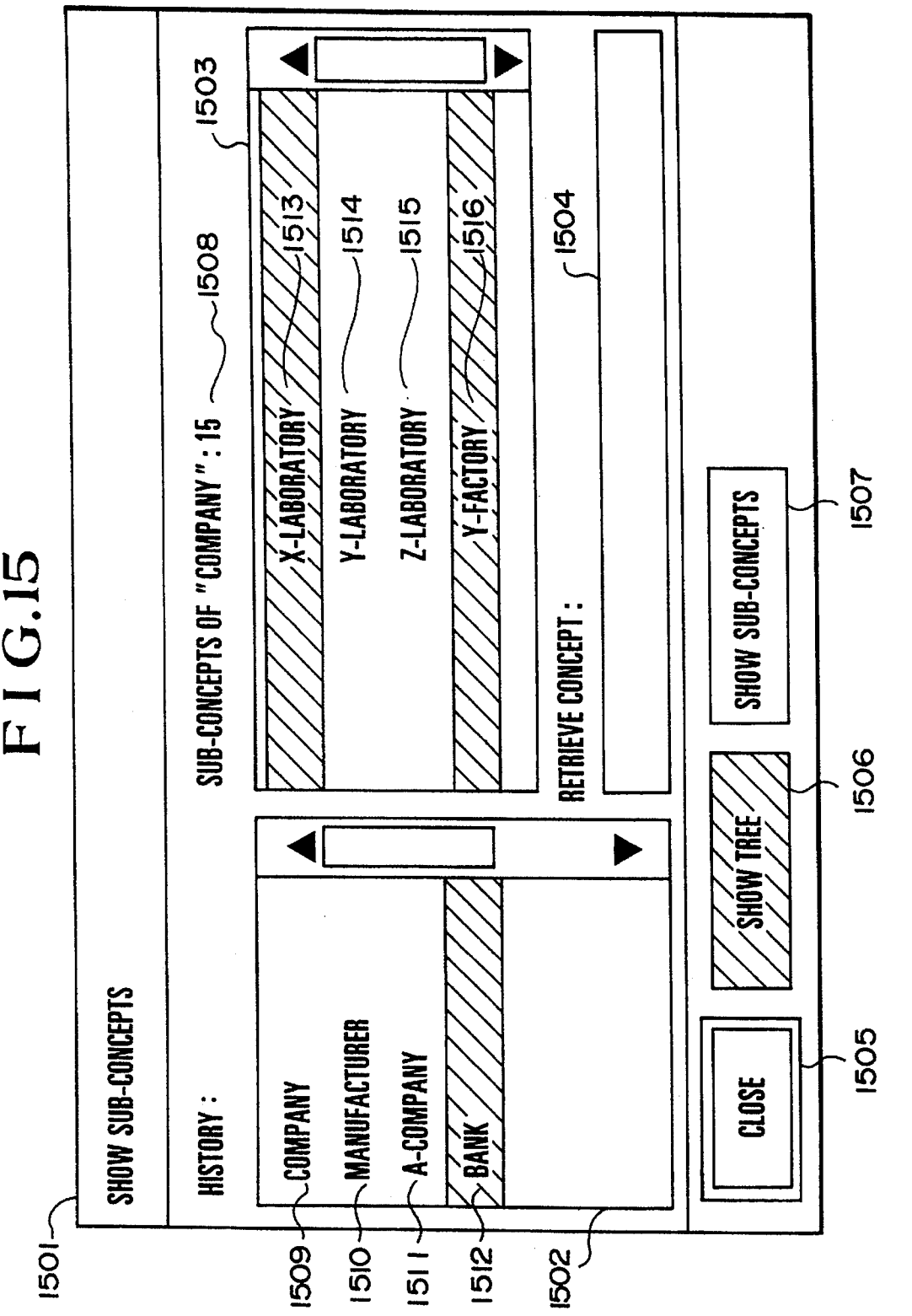
FIG. 15 is a diagram showing an example of display of the sub-concepts window when the user browses through much lower sub-concepts.

In the sub-concept list area 1403, when the user selects "A-company" 1412 and further selects "show sub-concepts" 1407 from menu, the display is revised in steps 4012–4014 as shown in FIG. 15. In the figure, the selected concept "A-company" 1511 is listed additionally by being indented below the parent concept "manufacturer" 1510. Listed in the sub-concept list area 1503 are part-concepts of the "A-company", with a mark "•" being affixed to the head of item indicative of a part-concept.

Figure 16:
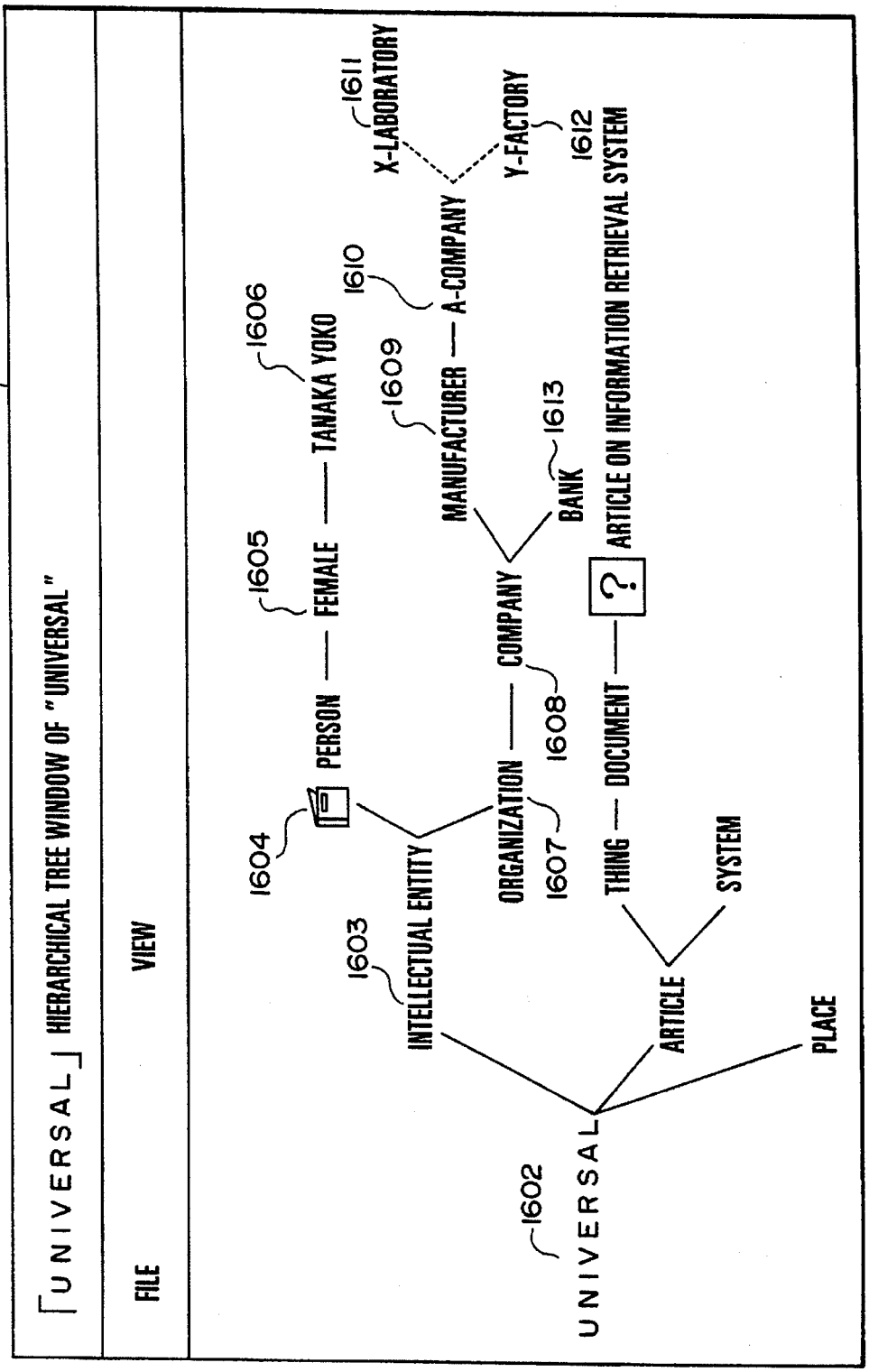
FIG. 16 is a diagram showing an example of display after the user has revised the display of sub-conceptual window from the sub-concepts window.

Referring back to FIG. 40, in case the user clicks the mouse at a concept displayed in the sub-concept list area 1303 in step 4006 and selects "show tree" 1306 in the sub-concepts window 1301 in step 4007, the system lists additionally the selected concept (node) in the sub-conceptual window. For example, when the user selects "•X-laboratory" 1513 and "•Y-factory" 1516 in the list of part-concepts 1503 and further selects "show tree" 1506 from menu, the sub-conceptual window of FIG. 12 is revised as shown in FIG. 16. In the figure, the selected concepts "•X-laboratory" and "•Y-factory" are added to the display of partial hierarchical tree. In order to link the additional "•X-laboratory" and "•Y-factory" to the existing concept "company" 1608 that has been displayed in the step of FIG. 12, concepts "manufacturer" 1609 and "A-company" 1610 are also added to the tree. By repeating the foregoing operations, it is possible for the user to collect only concepts in concern in the sub-conceptual window as shown in FIG. 12 and FIG. 16.

Figure 41:
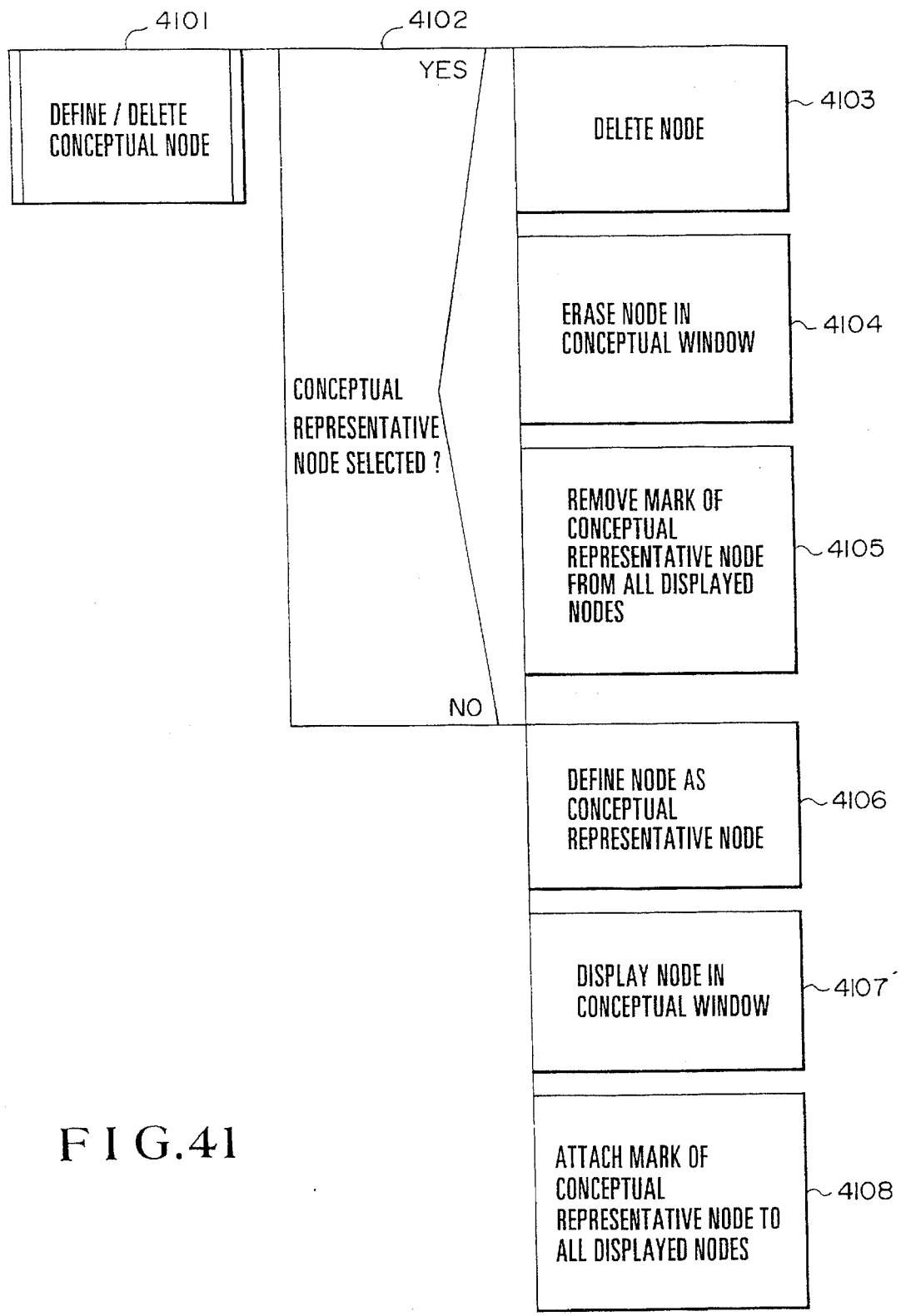
FIG. 41 is a flowchart showing the conceptual node define delete operation.

Next, the conceptual node define/delete operation will be explained in detail with reference to FIG. 41. As explained on FIG. 38, in case when the user selects a conceptual representative node in the conceptual window 1101 as shown in FIG. 11 and further selects "delete conceptual node" 1108 below the "view" 1104 of menu, the system implements the conceptual node deleting operation as shown in FIG. 41. In another case, as explained on FIG. 39, when the user selects a node in the sub-conceptual window 1201 and further selects "delete conceptual node" 1207 below the "view" 1203 of menu, the system implements the conceptual node define/delete operation. Since the conceptual window 1101 as shown in FIG. 11 displays conceptual representative nodes that are a collection of concepts of user's concern, the menu below the "view" 1104 includes only the "delete conceptual node" 1108.

Referring to FIG. 41, the system finds in step 4102 as to whether or not the selected node is a conceptual representative node. If it is found to be a conceptual representative node, the system deletes the definition of the conceptual representative node pertinent to that selected node in step 4103. Specifically, the system deletes the node from the tables of FIGS. 5 and 6 and revises the tree display data that is stored in the form of S-expression of LISP. The system erases the displayed node in the conceptual window in step 4104 and removes the mark of conceptual representative node (frame with bold left edge) from all nodes displayed in the window in step 4105.

If the selected node is found to be not a conceptual representative node in step 4102, the system defines the node as a conceptual representative node in step 4106. Specifically, the system defines the node in the tables of FIGS. 5 and 6 and revises the tree display data that is stored in the form of S-expression of LISP. The system displays the node in the conceptual window in step 4107 and affixes the mark of conceptual representative node to all nodes displayed in the window in step 4108.

Figure 17:
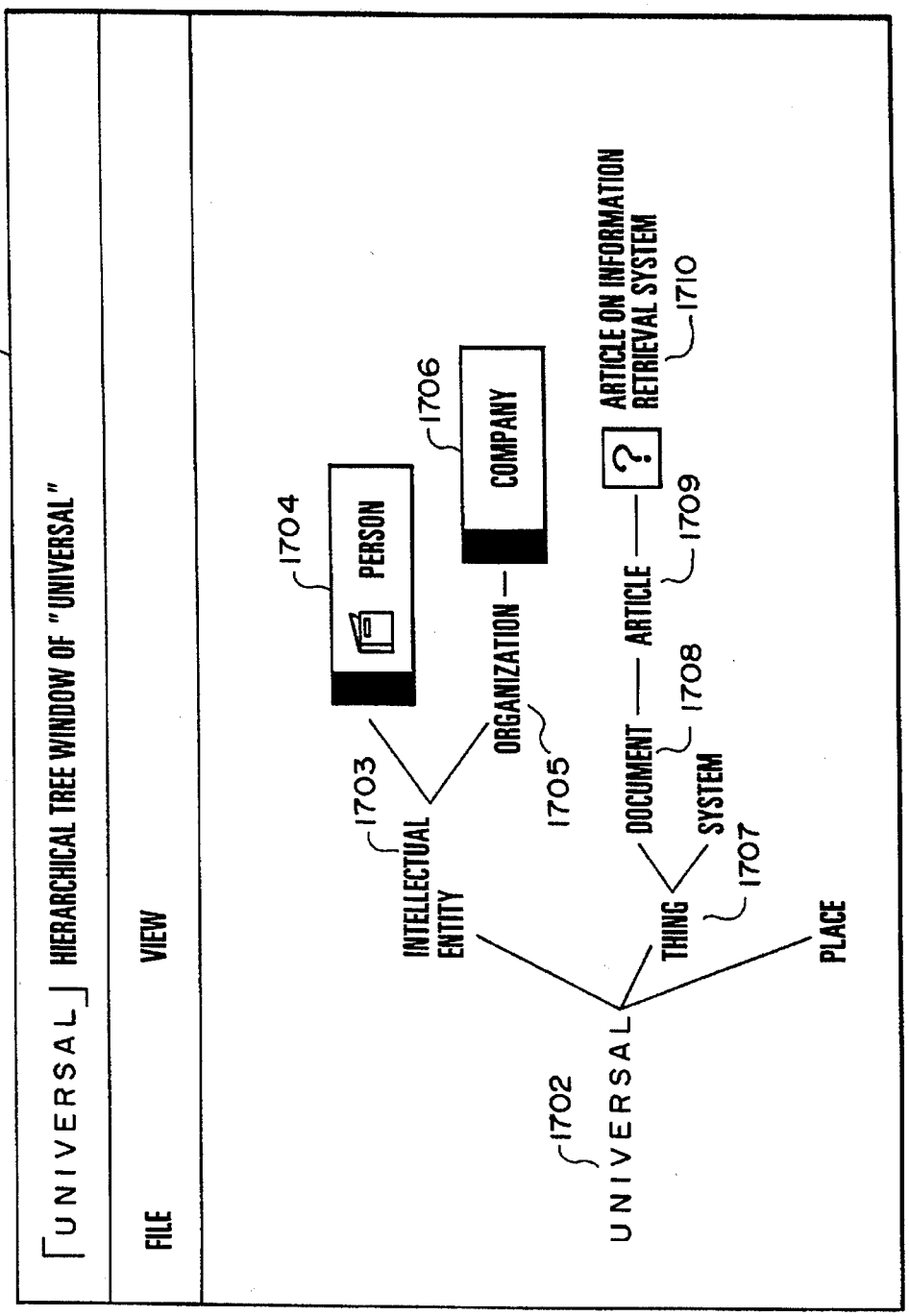
FIG. 17 is a diagram showing an example of display after the user has revised the display of sub-conceptual window at the definition of concepts as conceptual representative nodes.
Figure 18:
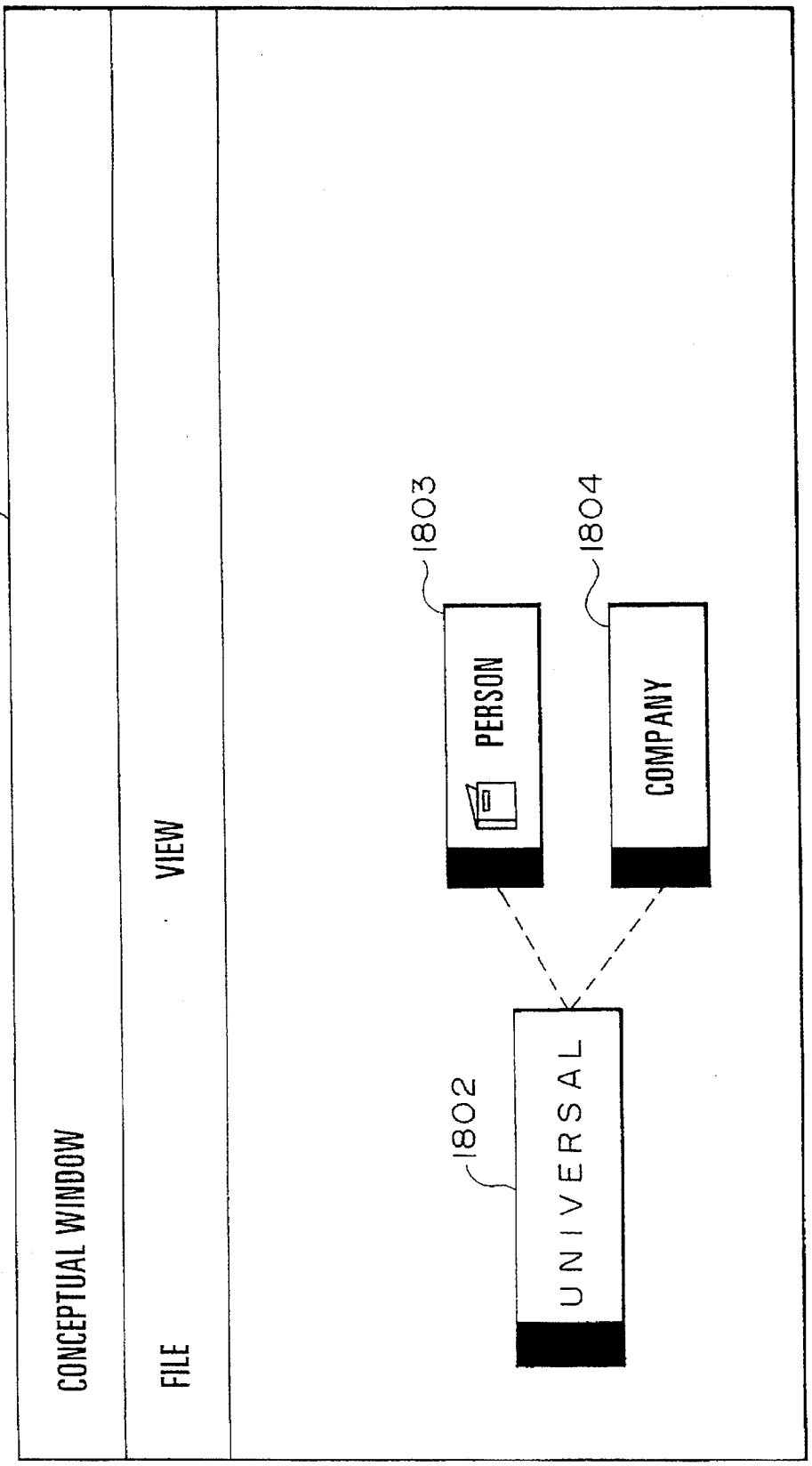
FIG. 18 is a diagram showing an example of display after the user has revised the display of conceptual window at the definition of concepts as conceptual representative node.

For example, in the sub-conceptual window 1601 of FIG. 16, the user selects "person" 1604 and "company" 1608 and specifies "define conceptual node" in the pulldown menu 1207 of FIG. 12, and consequently these selected nodes that are not conceptual representative nodes are newly defined as conceptual representative nodes in steps 4106–4108. The window 1601 of FIG. 16 is revised as shown in FIG. 17, and "person" 1803 and "company" 1804 are added as conceptual representative nodes in the conceptual window as shown in FIG. 18. In FIG. 17, the selected nodes "person" 1704 and "company" 1706 are framed indicative of conceptual representative nodes and their sub-concepts, which are retained, are erased.

As another example, in the sub-conceptual window 1701 of FIG. 17, the user selects "person" 1704 and "company" 1706 and specifies "delete conceptual node" 1207 in the pull-down menu of FIG. 12, and consequently these selected nodes that are conceptual representative nodes are removed from the definition of conceptual representative node in steps 4103–4105. The conceptual window of FIG. 18 is revised as shown in FIG. 11 and the sub-conceptual window of FIG. 17 is revised as shown in FIG. 12.

Even if the user terminates the session in the state of FIG. 18, the same window is popped up when the system is restatted, and the user can resume the operation.

Figure 19:
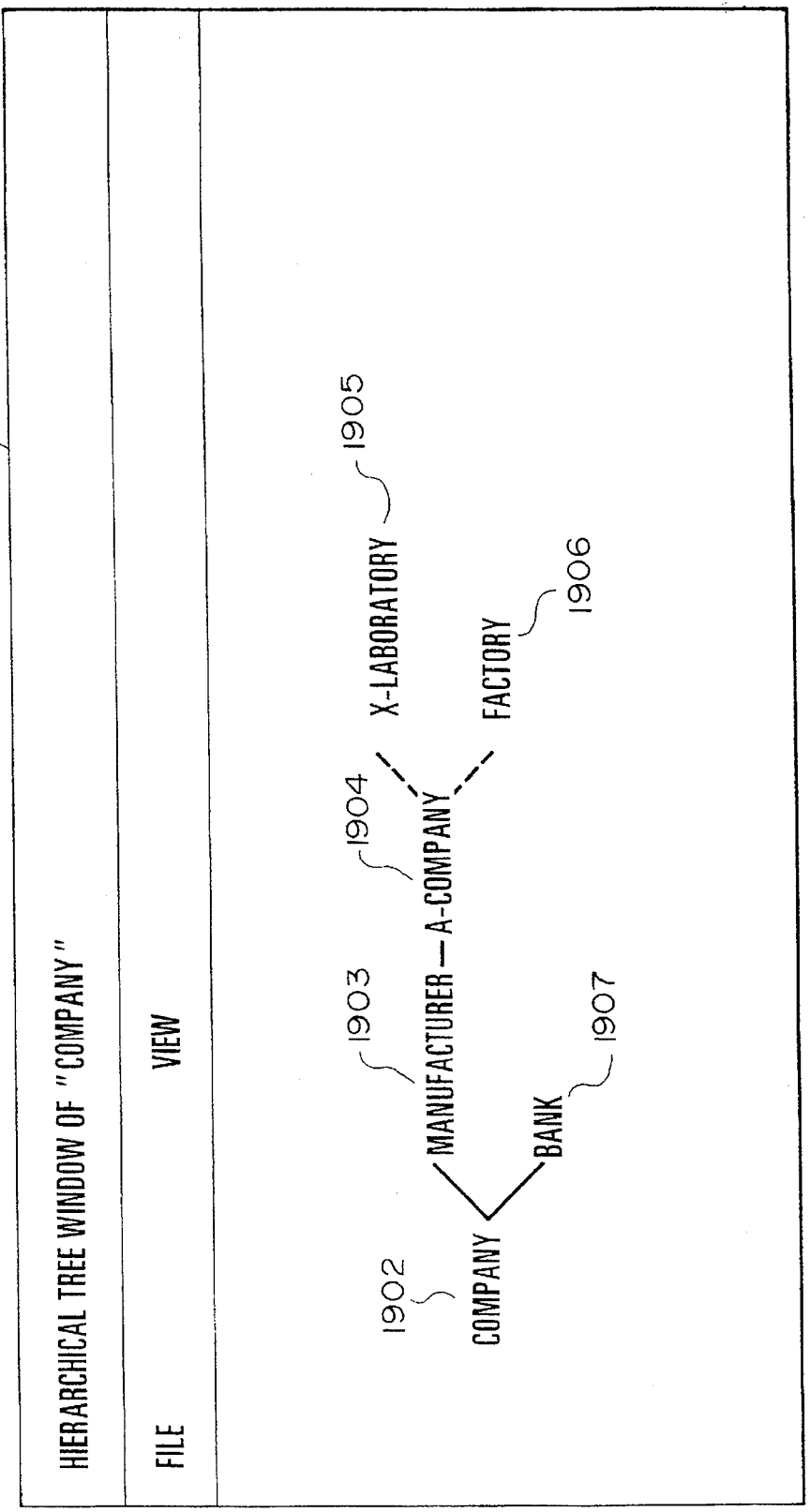
FIG. 19 is a diagram showing an example of display after the user has selected a conceptual representable node.

When the user double-clicks the mouse at the conceptual representative node "company" 1706 on the screen of FIG. 17, the system displays the retained sub-concepts in a sub-concept window 1901 as shown in FIG. 19, and the user can edit the display.

Next, the operation on the super-concepts window 2001 will be explained in detail with reference to FIG. 42.

As explained on FIG. 39, when the user selects a node on the sub-conceptual window 1201 or 1901 as shown in FIG. 12 or FIG. 19 and further selects "show super-concepts" 1208 below "view" 1203 of menu, the system displays a super-concepts window 2001 as shown in FIG. 20. The figure shows a display after the user has selected a node "A-company" 1904 in FIG. 19 to open the super-concepts window.

Initially, the system displays the super-concepts window 2001 in step 4201 as shown in FIG. 20. Shown in the figure is a tree structure of concepts between the selected concept "A-company" 2007 and the superlative concept "UNIVERSAL" 2002 linked in the is-a relation and their appositive concepts. Concepts 2002, 2003, 2013, 2004, 2005 and 2006 in frames (actually they are shaded in display) are those linked with the "A-company" 2007 in the is-a relation. Concepts "company" 2005 and "person" 2011 are marked indicative of concepts defined as conceptual representative nodes.

Referring back to FIG. 42, the system searches for super-concepts and appositive concepts of the selected concept and displays them in a tree structure, with the super-concepts being shaded, in steps 4202–4204.

In the next step 4205, if the user selects "close" 2015 from menu of the window 2001, the system closes the window 2001 and terminates the operation on this window in step 4210. Otherwise, the following operations of steps 4206–4209 take place.

Initially, when the user clicks the mouse at a concept displayed in the super-concepts window 2001, the system detects the node ID of the node in step 4207 and the node is selected. In the next step 4208, the system finds whether or not "show sub-concepts" 2016 is selected by the user from menu of the super-concepts window 2001. With "show sub-concepts" being selected, the user edits the displayed sub-concepts. For example, when the user selects "company" 2005 and "show sub-concepts" 2016 from menu in FIG. 20, a sub-concepts window 1301 as shown in FIG. 13 is displayed. The operation on the sub-concepts window has been already explained on FIG. 40.

Next, the operation on the query edit window 2101 will be explained. As explained on FIG. 38, when the user selects a conceptual representative node and further selects "retrieve" 1106 below "file" 1102 of menu in the conceptual window 1101 as shown in FIG. 11, a query edit window as shown in FIG. 21 appears in step 3810 of FIG. 38. Otherwise, as explained on FIG. 39, when the user selects a node and further selects "retrieve" 1205 below "file" 1202 of menu in the sub-conceptual window 1201 as shown in FIG. 12, a query edit window as shown in FIG. 21 appears in step 3913 of FIG. 39.

Figure 43:
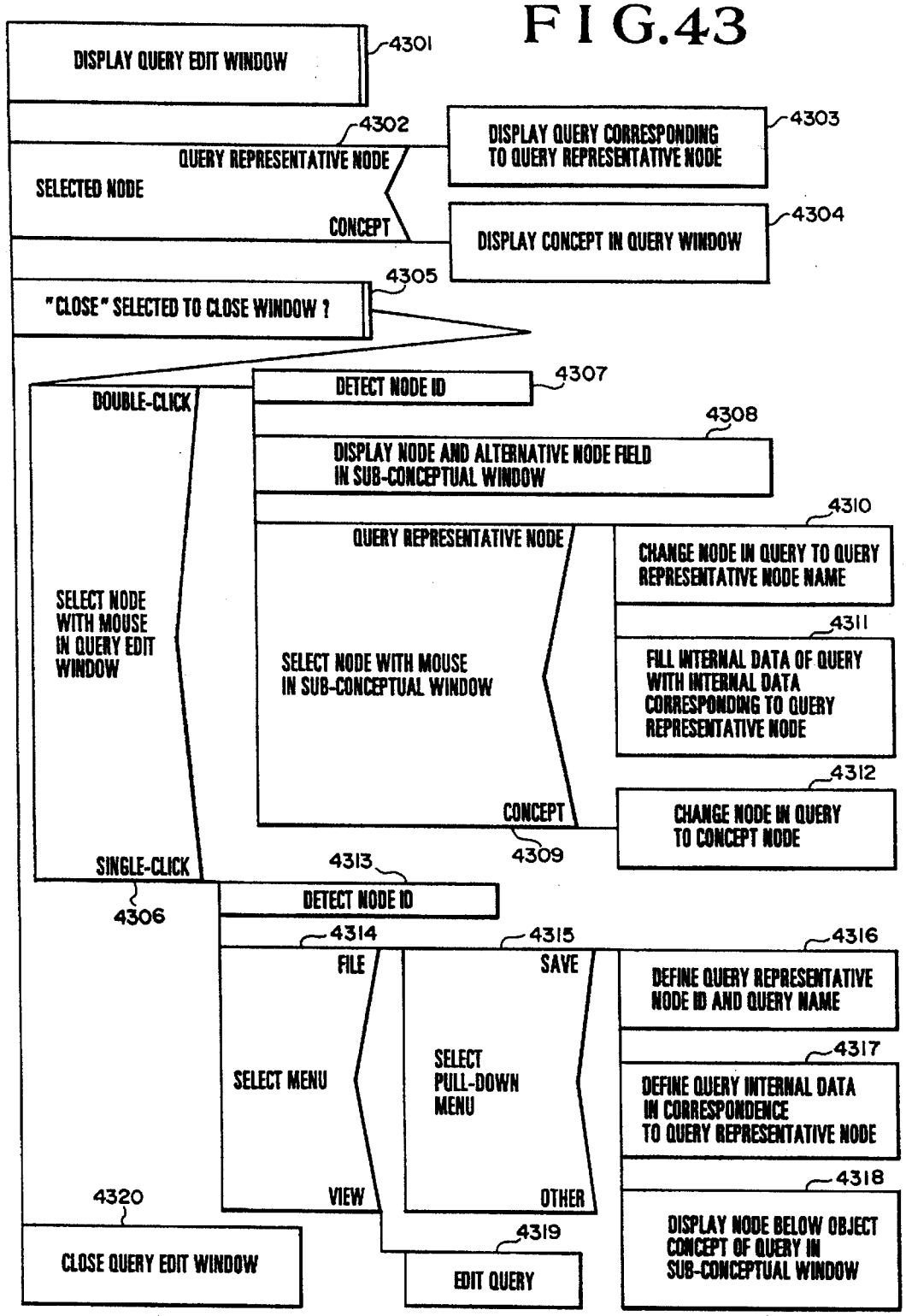
FIG. 43 is a flowchart showing the query edit operation in the query edit window.

Initially, the system displays the query edit window 2101 of FIG. 21 in step 4301 of FIG. 43. Next, the system finds in step 4302 as to whether the selected node is a query representative node or a concept. If it is found to be a query representative node, the system displays the query representative node name and the query corresponding to the query representative node in the query edit window 2101 in step 4303. If the selected node is found to be a concept, the system displays the concept name in the query edit window 2101 in step 4304.

FIG. 21 shows the query edit window 2101 displayed after the user has selected the concept "company" 1706 in the sub-conceptual window 1701 of FIG. 17 with the mouse in steps 3911, 3912 and 3913 of FIG. 39 and selected "retrieve" 1205 below "file" of menu in FIG. 12. For prompting the creation and editing of a query pertinent to the "company" 1706, "company:?" is displayed.

If the user selects "close" 2104 in pull-down menu below "file" 2102 of menu in step 4305, the system closes the window and terminates the operation on this window in step 4320. Otherwise, the following operations of steps 4306–4319 take place.

Figure 22:
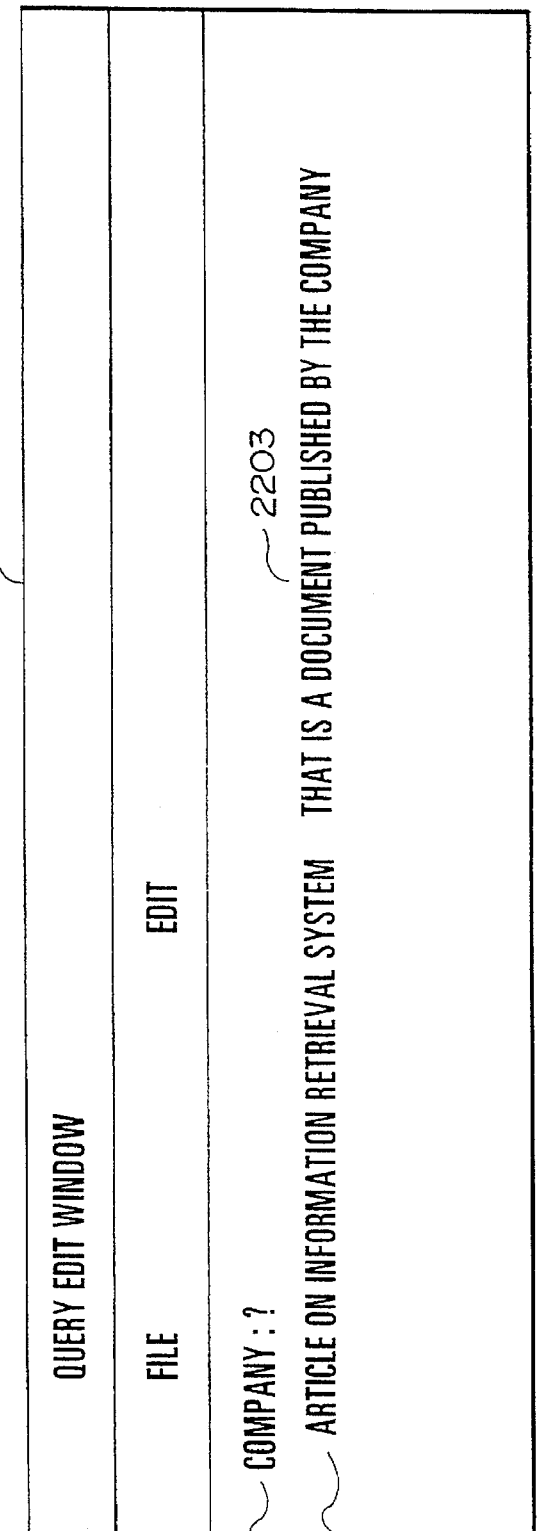
FIG. 22 is a diagram showing an example of display of the query edit window.
Figure 23:
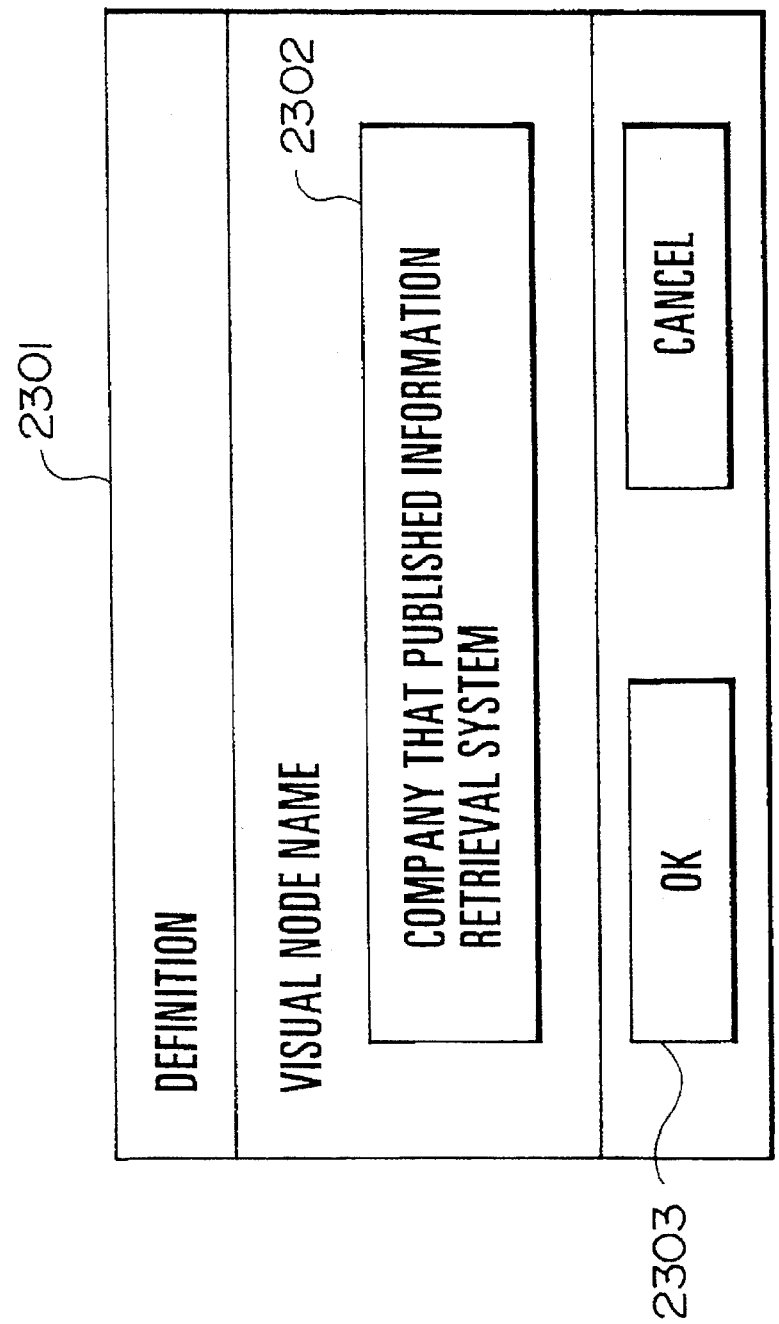
FIG. 23 is a diagram showing the window for entering the name of a query representative node.

The basic query edit operation is described in Japanese patent publication JP-A-62-297568, and the following explains the procedure in brief by taking an example shown in FIG. 21 through FIG. 23.

Initially, when the user double-clicks the mouse at the node "article" 2107 in the query in step 4306, the sub-conceptual window is revised so as to show the concept field with the revision of "article" in steps 4306–4312. In this example, the concept field with the revision of "article" is a sub-concept of "document", and therefore the display is revised such that the user can select only sub-concepts of the "document" 1708 in the sub-conceptual window including the "document", as shown in FIG. 17. In the figure, when the user selects a query node "article of information retrieval system" 1710, the concept "article" 2107 of FIG. 21 is revised to "article of information retrieval system". FIG. 22 shows the query edit window 2201 after this revising operation.

In step 4306 and steps 4313–4318, when the user selects the node "company" 2204 in the query and further selects "save" 2105 in FIG. 21 from pull-down menu below "file" of menu, the system displays a pop-up window 2301 as shown in FIG. 23. Subsequently, when the user enters a name "company that published information retrieval system" 2302 and then selects "OK" 2303 from menu, a query node "company that published information retrieval system" is displayed as a sub-concept of "company" in the sub-concepts window. Whichever concept in query the user selects, the condition affixed to that concept is assumed to be a query and it can be reserved as a query representative node.

Figure 44:
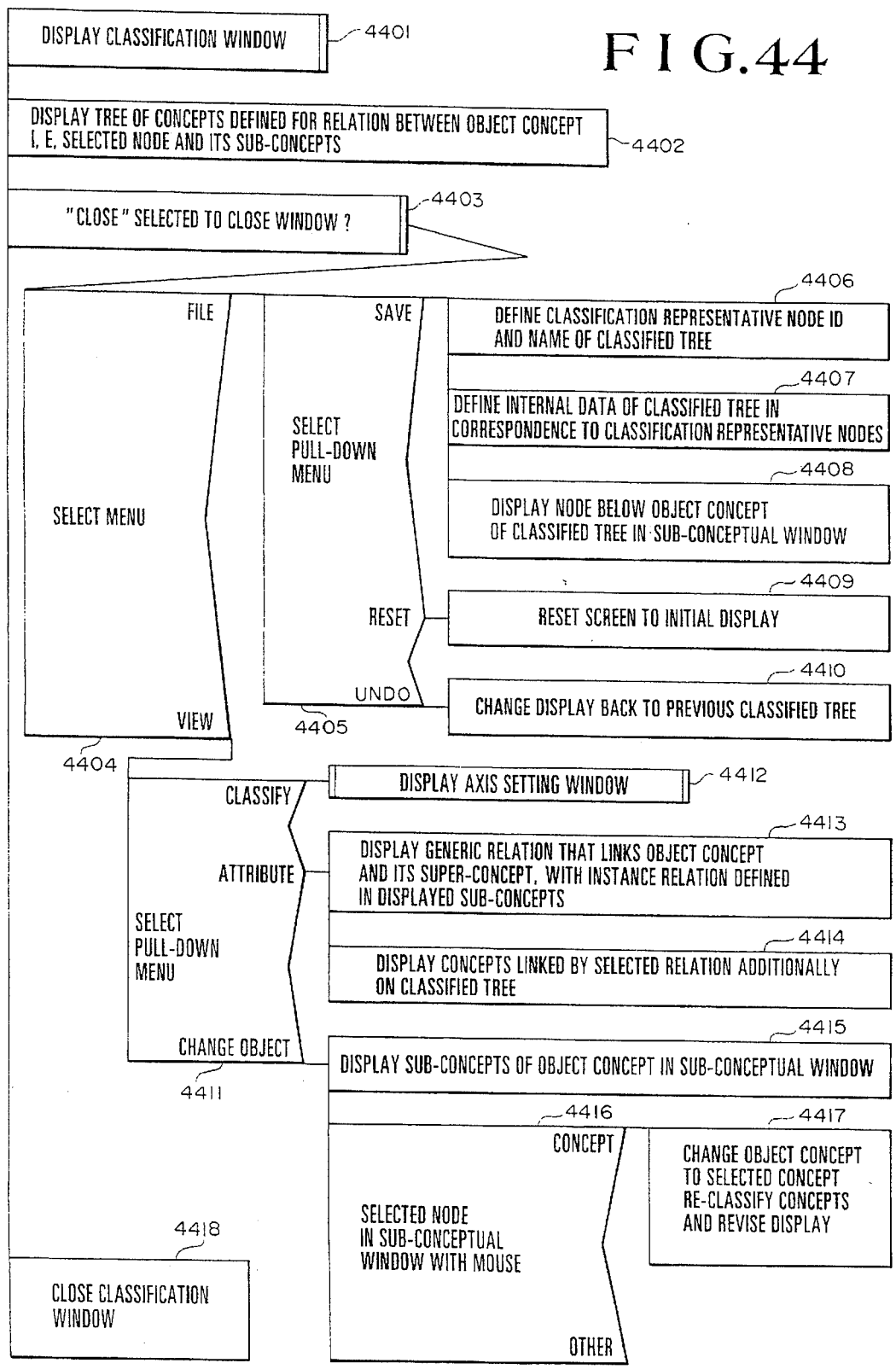
FIG. 44 is a flowchart showing the display operation for the classification window.

Next, the operation on the classification window will be explained in detail with reference to FIG. 44. As explained on FIG. 39, when the user selects a node in the sub-conceptual window 1201 or 1701 as shown in FIG. 12 or FIG. 17 and further selects "show classified tree" 1209 below "view" 1203 of menu, the system displays a classification window 2401 as shown in FIG. 24. The figure shows a display after the user has selected a concept "person" 1704 of FIG. 24 to open the classification window.

In the first step 4401, the system displays the classification window 2401 as shown in FIG. 24. In the next step 4402, the system displays a tree of concepts that are already defined for the relation between the selected node, i.e., classification object concept, and its sub-concepts. For example, in the classification window 2401 of FIG. 24, the concepts that are sub-concepts of the selected concept "person" 2411 in the is-a relation, with their relation (attribute) being defined, are displayed. In this example, "Tanaka Yoko" 2412, etc. having a defined relation such as "school of graduate" and "place of work" are displayed as sub-concepts.

In the next step 4403, if the user selects "close" 2404 from pull-down menu below "file" 2402 of menu in the window, the system closes the window and terminates the operation on this window in step 4418. Otherwise, the following operations of steps 4404–4417 take place.

In the first step 4404, the system finds as to whether the selected item of menu is "view" 2403 or "file" 2402. If "view" is found selected, the system finds in step 4405 as to which of "save" 2405, "reset" 2406 or "undo" 2407 is selected, and branches the operation to step 4406, 4409 or 4410 depending on the selection. If "file" is found selected in the above step 4404, the system finds in step 4411 as to which of "classify" 2408, "show attributes" 2409 or "change object" 2410 is selected, and branches the operation to step 4412, 4413 or 4415 depending on the selection. The following explains the operation of each case.

Figure 25:
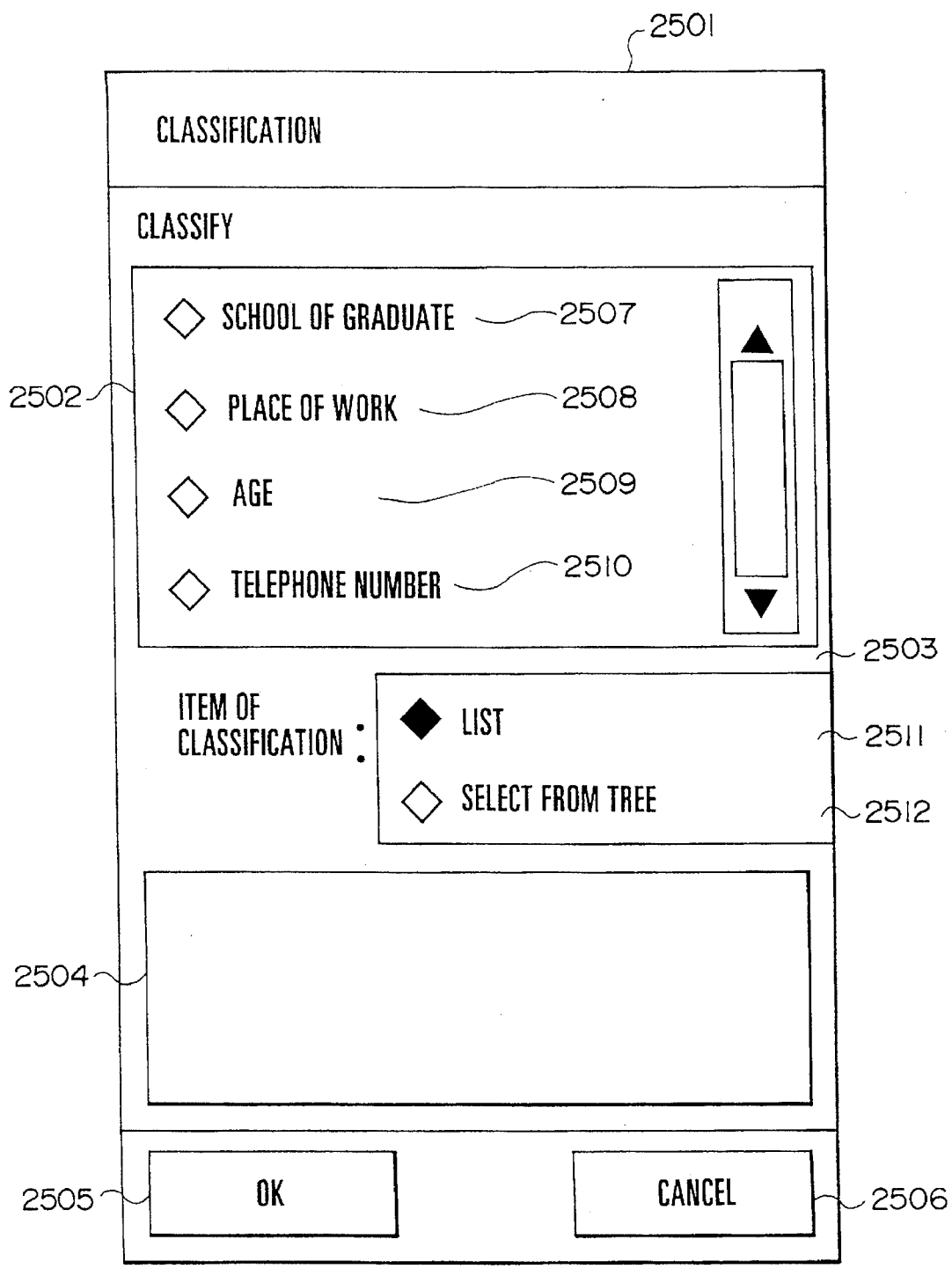
FIG. 25 is a diagram showing an example of display of the axis setting window.

In response to the user's selection of "classify" below "view" 2403 of menu, the system displays a pop-up window (axis setting window) as shown in FIG. 25 in step 4412. The user is allowed to specify the mode of classification for the selected concept on this window. FIG. 25 shows the axis setting window 2501 displayed when the user has selected "classify" 2408 below "view" 2403 of menu.

Figure 45:
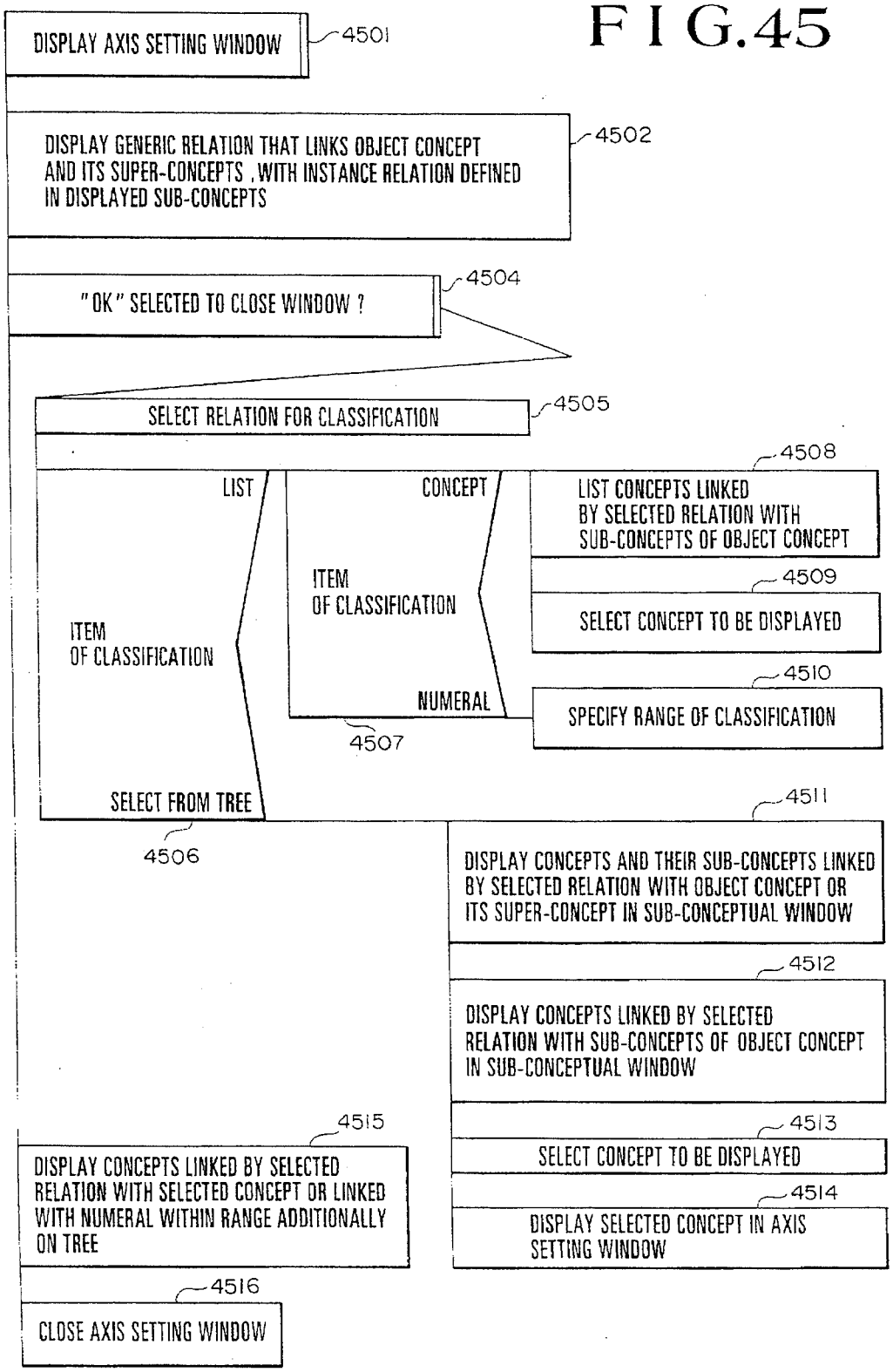
FIG. 45 is a flowchart showing the operation for the axis setting window.

FIG. 45 shows the procedure of operation on the axis setting window. In the first step 4501, the system displays the axis setting window, and in the next step 4502 lists the generic relations that link the concept to be classified and its super-concepts, with the instance relation being defined in the displayed sub-concepts. For example, among generic relations (attributes) that link "person" and its super-concepts, those with instance relations (attributes) corresponding to them defined in the sub-concepts of "person" are listed in an axis selection area 2502 of the axis setting window 2501.

In the next step 4504, when the user selects "OK" 2505 from menu of the window, the system adds concepts in connection with concepts selected based on the selected relation or in connection with numerals within a certain range to the tree in step 4515, and closes the axis setting window and terminates the operation on this window in step 4516. Otherwise, the following operations of steps 4505–4514 take place.

In the first step 4505, the user selects a mode of classification. In the next step 4506, the system finds whether the specified classification mode is "list" or "select from tree". With "list" being selected, the system finds in step 4507 whether the classification is of concept-based or numeral-based. In the case of the concept-based classification, the system lists concepts in linkage with sub-concepts of the object concept to be classified in step 4508, and the user selects an intended concept to be listed. In the case of the numeral-based classification in step 4507, the user specifies the range of numerals to be classified in step 4510.

With "select from tree" being selected in step 4506, the system displays, in the sub-conceptual window in step 4511, concepts and their sub-concepts in linkage in the selected generic relation with the object concept or its sub-concept. In the next step 4512, the system displays concepts in the selected instance relation with sub-concepts of the object concept in the sub-conceptual window in step 4512. The user selects intended concepts to be listed in step 4513, and the system lists the selected concepts in step 4514.

Figure 26:
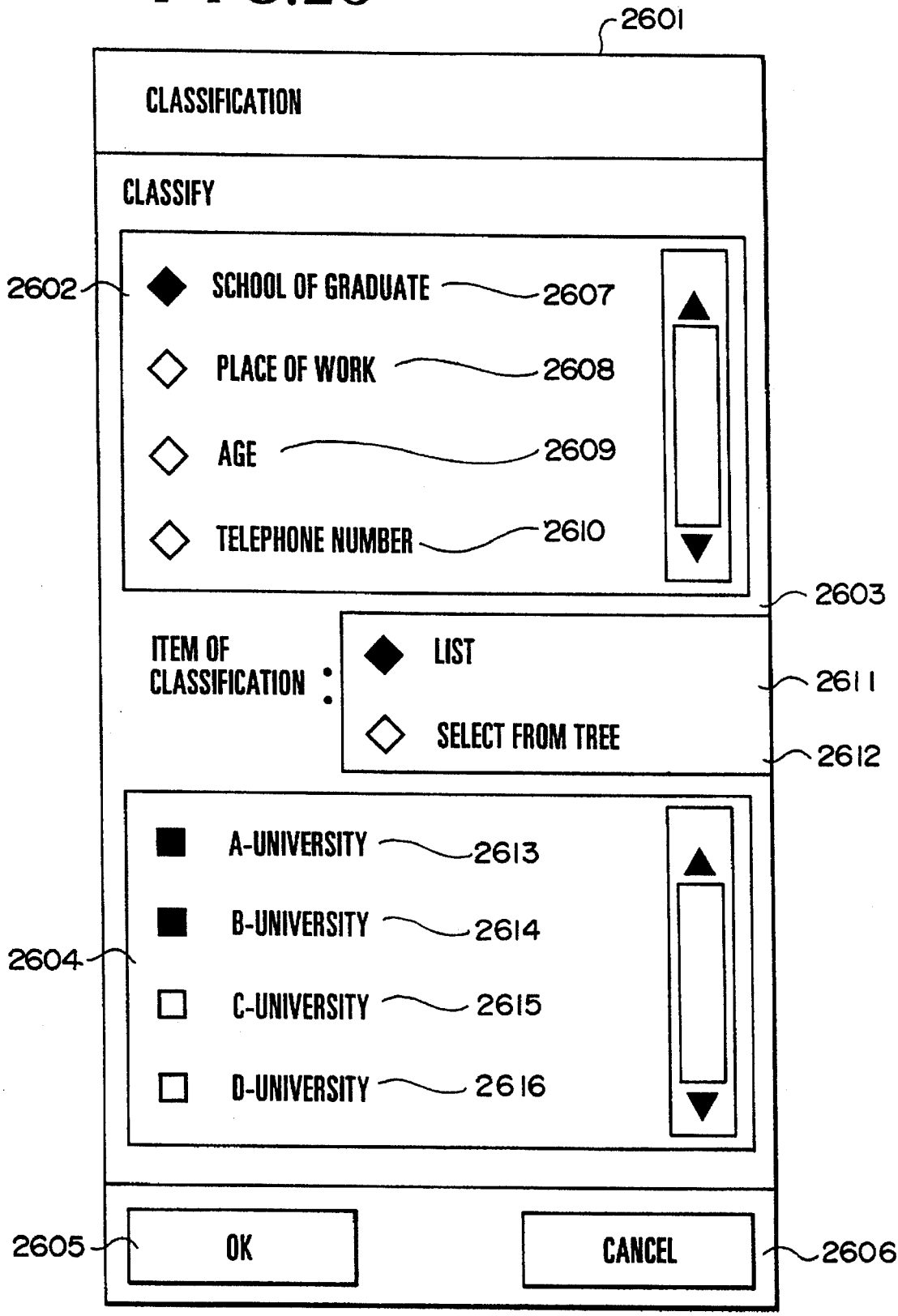
FIG. 26 is a diagram showing an example of entry to the axis setting window.

The following explains the operating procedure of FIG. 45 by taking a specific example. In FIG. 25, the user selects "school of graduate" 2507 from the list and further selects "list" 2511 for the mode of selection of items and range setting, for example. The operation proceeds from step 4506 to 4507 and to step 4508, at which the axis setting window 2501 of FIG. 25 is revised to a list as shown in FIG. 26. In the figure, concepts in linkage by the selected relation "school of graduate" with the sub-concepts of "person" are listed in the item or range setting area 2604. At this time point, no item is yet selected from the list of the area 2604. The list is ordered such that a "school of graduate" in more dense linkage with sub-concepts of "person" appears earlier. In this example, "A-university" 2613 in the most dense linkage with "person" (A-university has the largest number of graduates) is listed at the top.

Figure 27:
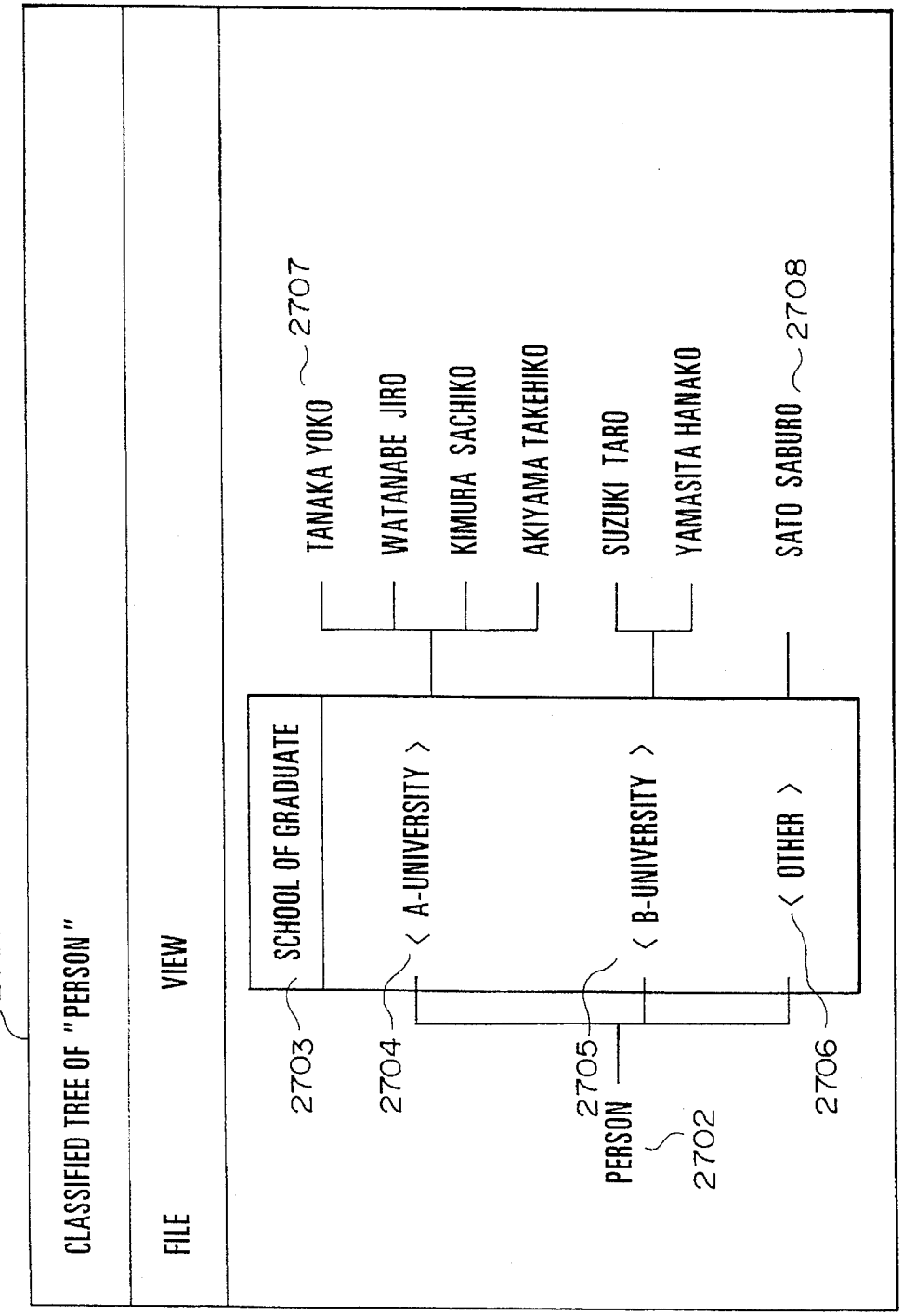
FIG. 27 is a diagram showing an example of display of the classification window.

Subsequently, the user selects in step 4509 "A-university" 2613 and "B-university" 2614 as intended concepts to be displayed in the axis setting window 2601 of FIG. 26, for example. In response to the user's selection of "OK" 2605 from menu of FIG. 26, the classified tree is revised as shown in FIG. 27 in step 4515. The axis setting window 2601 of FIG. 26 is closed in step 4516.

As a result of the foregoing operations, a classified tree as shown in FIG. 27 is displayed. Namely, concepts that are sub-concepts of "person" and have attributes "school of graduate" of "A-university", in this example, "Tanaka Yoko" and so on are displayed. Concepts "A-university" and "B-university" below "school of graduate" are displayed. A concept "Sato Saburo" having an attribute of "school of graduate" that is neither "A-university" nor "B-university" is displayed by being classified in "other" below the "school of graduate".

It is possible for the user to view a classified tree based on other attribute. For example, the user selects the displayed item "place of work" 2508 and further selects the "list" 2511 for the items and range of classification in FIG. 25, for example. FIG. 28 shows the axis setting window 2801 resulting from the above user's selection. The operation proceeds from step 4506 to 4507 and to step 4508, in which the item/range setting area 2804 lists the concepts that are linked in the selected relation "place of work" with the sub-concepts of "person" in step 4508 as shown in FIG. 28.

In case the user sets "select from tree" 2812 for the item/range classification mode in the axis setting window 2801 of FIG. 28, the item/range setting area 2804 becomes blank. In addition, the display is revised in steps 4511 and 4512 so as to discriminate concepts that are the items of classification among those displayed in the sub-conceptual window. In this example, the concepts "person" and "company" are linked by the generic relation "place of work", and therefore sub-concepts of "company" are displayed in a different color or by being framed so that the user can identify them.

Figure 29:
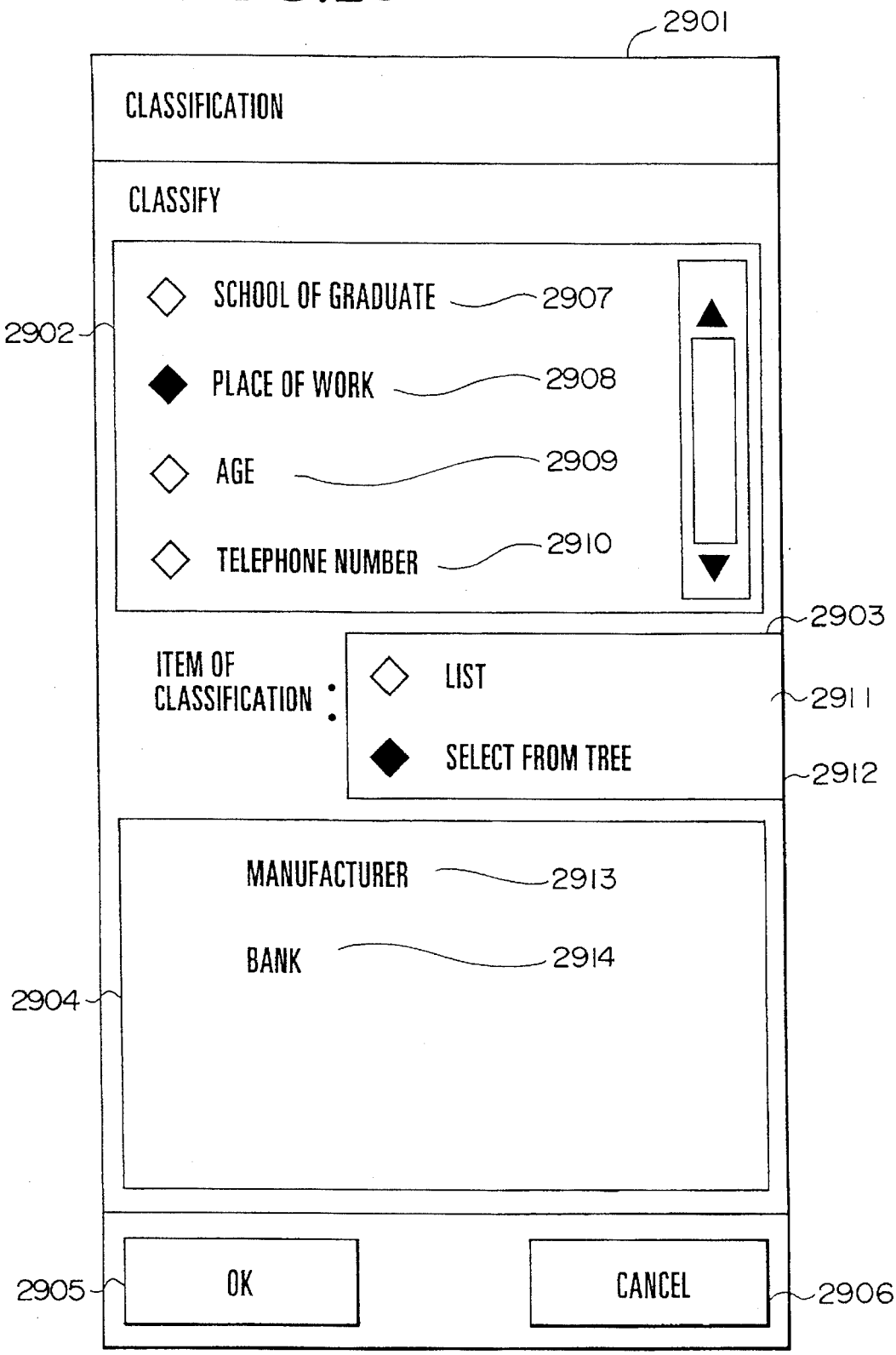
FIG. 29 is a diagram showing an example of entry to the axis setting window.

Namely, in the sub-conceptual window 1601 including the concept "company" 1608 in FIG. 16, only sub-concepts of the "company" change, allowing the user to select concepts with the mouse. If the user selects "manufacturer" 1609 and "bank" 1613 in step 4513, "manufacturer" 2913 and "bank" 2914 that become new items to be classified are added in the item/range setting area 2904 in step 4514 as shown in FIG. 29.

Figure 30:
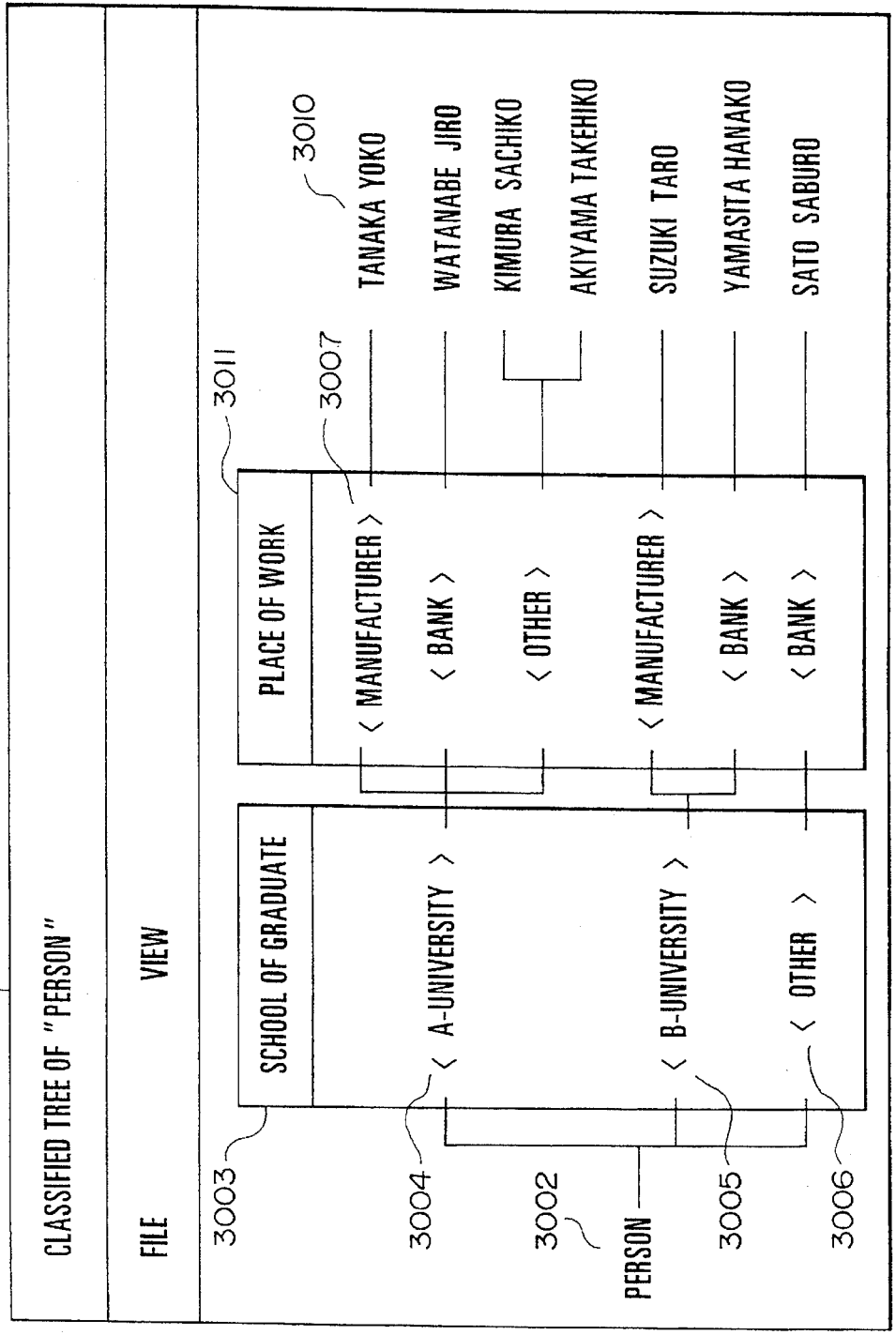
FIG. 30 is a diagram showing an example of display of the classification window.

In response to the user's selection of "OK" 2905 from menu, the displayed tree of FIG. 27 is revised in step 4515 as shown in FIG. 30. Namely, the concepts classified based on "school of graduate" 3003 are further classified based on "place of work" 3011 and a resulting tree is displayed.

Figure 31:
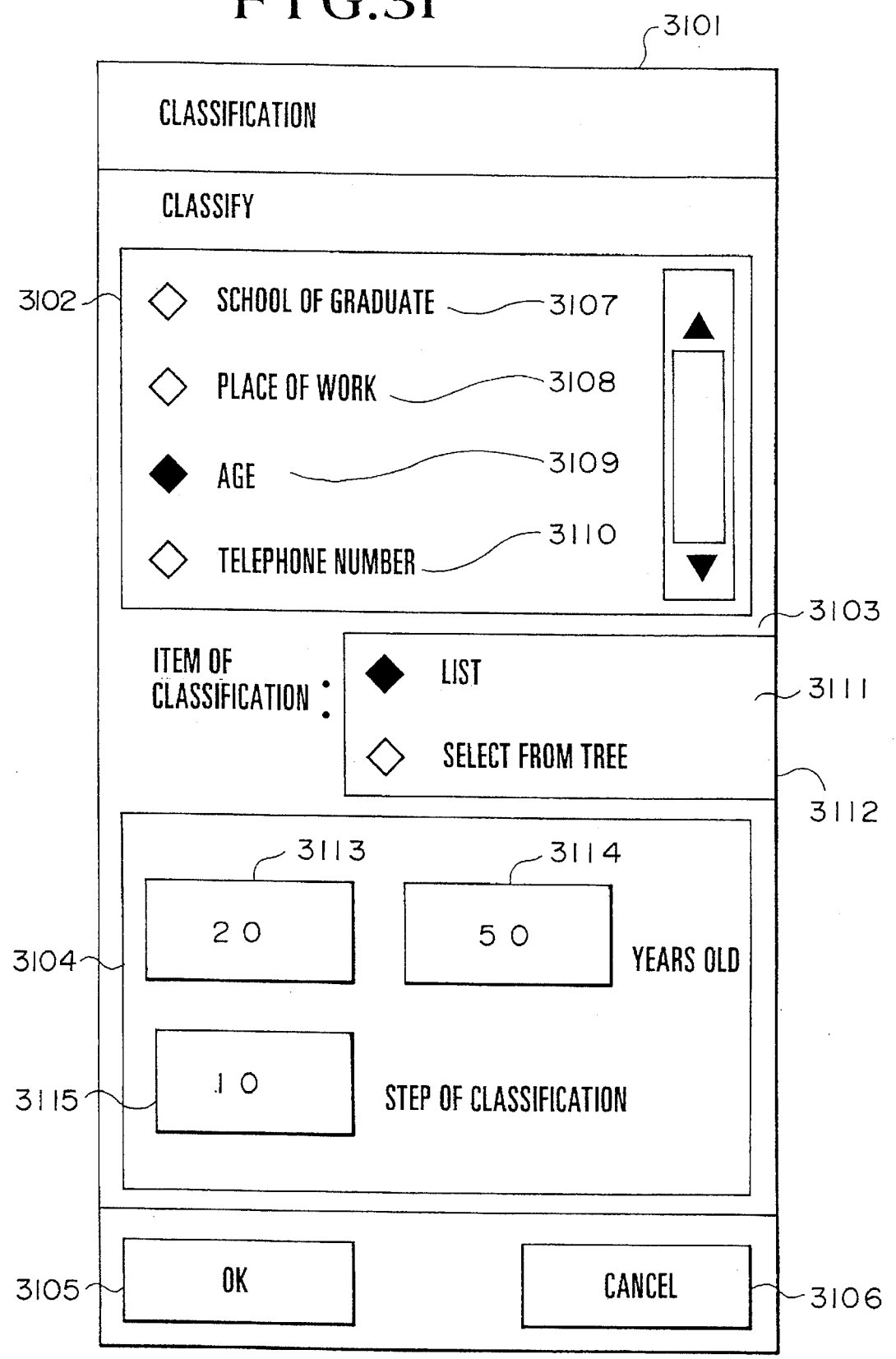
FIG. 31 is a diagram showing an example of entry to the axis setting window.
Figure 32:
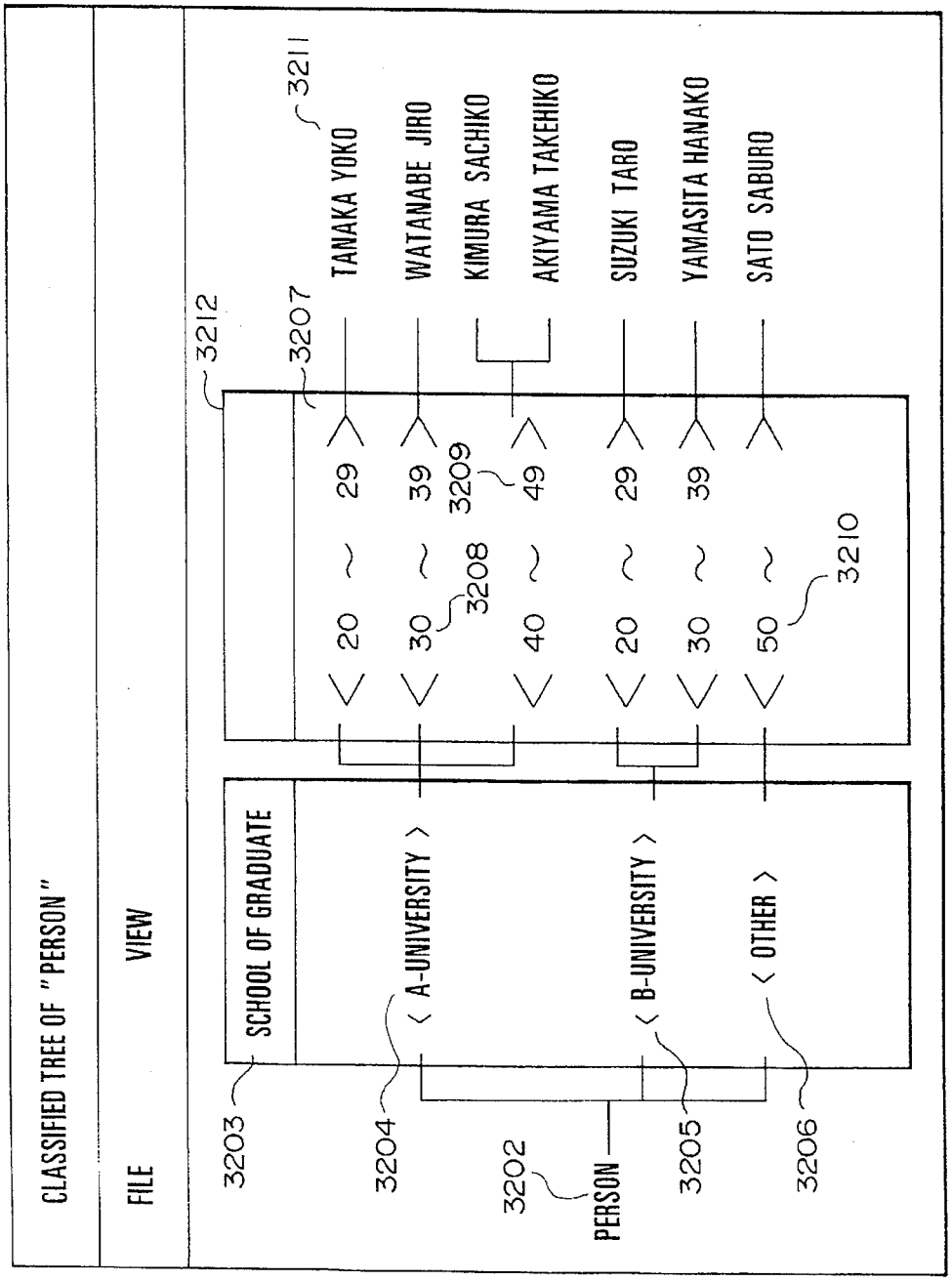
FIG 32 is a diagram showing an example of display of the classification window.

It is also possible for the user to classify concepts based on the specified range of numerals. For example, the user selects "age" 2509 in the list of FIG. 25 and further selects "list" 2511 as an item/range selection mode. FIG. 31 shows a axis setting window 3001 resulting from the above user's selection. Since the "age" is associated with numeral, the item/range setting area 3104 is revised in steps 4507 and 4510 as shown in FIG. 31. Namely, the item/range setting area 3104 is revised so that the user can specify the range of numeral pertinent to the age. The user specifies the classification based on the age in the range from 20 to 50 years old in a step of 10 for example, then the classification window of FIG. 27 is revised as shown in FIG. 32. The figure reveals that "Tanaka Yoko" 3211 who is a sub-concept of "person" 3202 is a "graduate" 3203 of "A-university" 3204 and the "age" 3212 is in the range of "20–29" 3207. These are the explanation of a specific example of the operation on the axis setting window.

Referring back to FIG. 44, if the user selects "reset" 2406 from pull-down menu below "file" of menu in FIG. 24 in steps 4404 and 4405, then the system clears the screen and displays the initial screen in step 4409. For example, when the user selects "reset" from pull-down menu on the screen of classified tree shown in FIG. 27 in step 2406 of FIG. 24, the initial screen of FIG. 24 appears.

In another case if the user selects "undo" 2407 from pull-down menu below "file" of menu in steps 4404 and 4405, then the system implements the undo process in step 4410 and revises the display back to the previous classified tree. For example, when the user resets the screen of FIG. 27 to the initial screen of FIG. 24 and then selects "undo", the screen of FIG. 27 will return.

When the user selects "show attributes" 2409 from pull-down menu below "view" of menu in FIG. 24 in steps 4404 and 4411, the system lists, in the attribute selection window in step 4413, the generic relations that link the concept to be classified and its super-concept, with the instance relation being defined in the displayed sub-concepts. In addition, the system adds to the classified tree in step 4414 the concepts in linkage by the selected relation.

Figure 33:
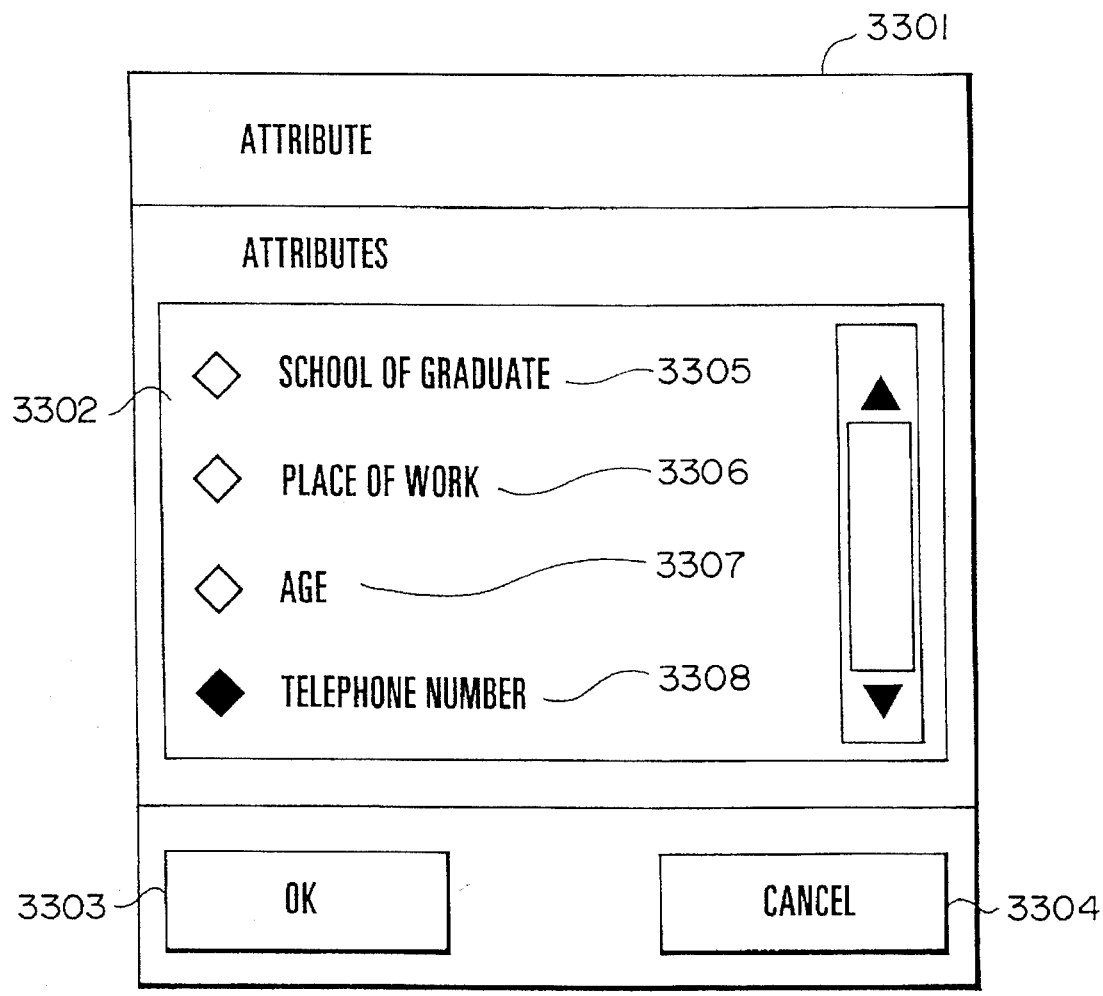
FIG. 33 is a diagram showing an example of entry to the attribute selection window.
Figure 34:
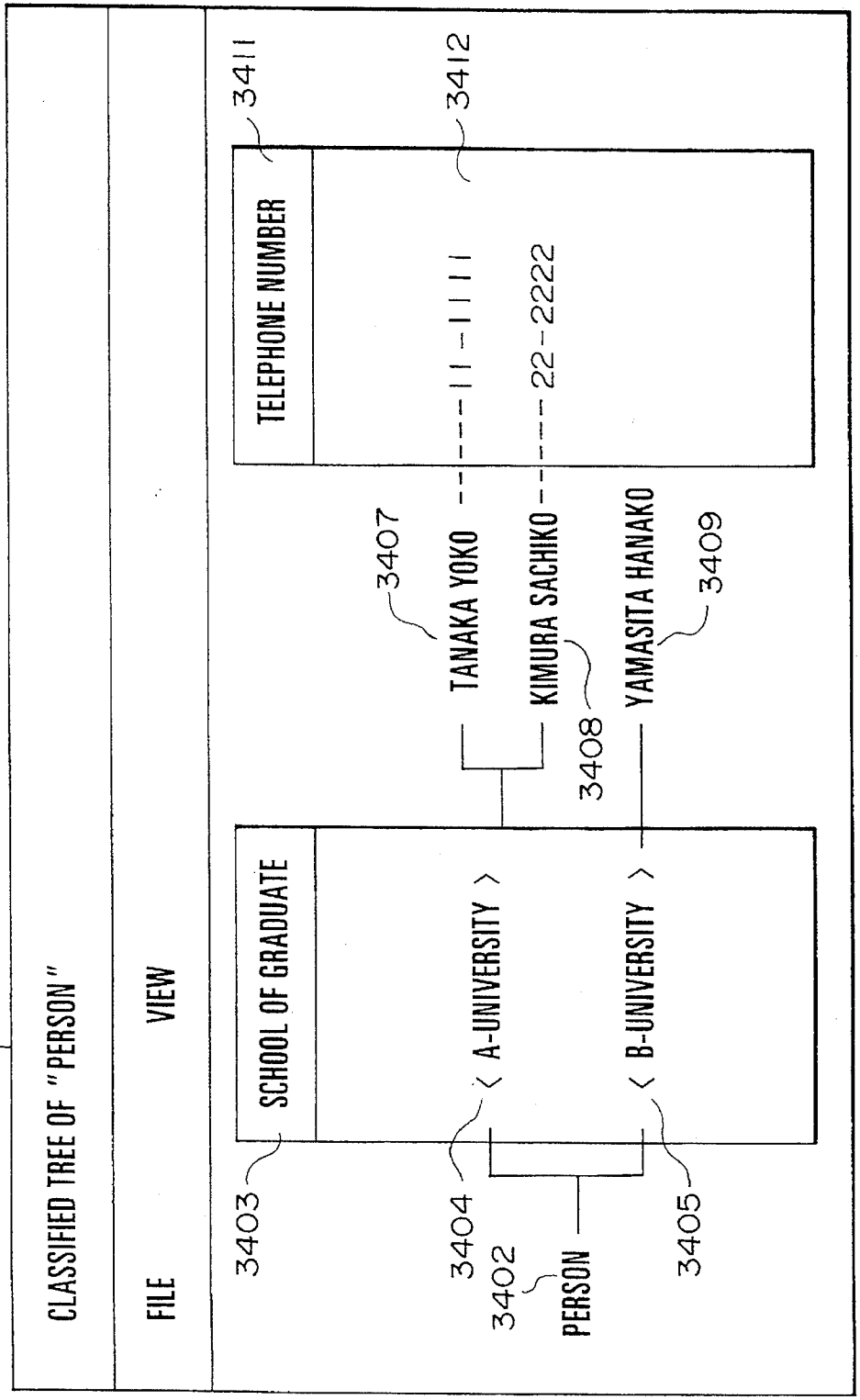
FIG. 34 is a diagram showing an example of display of the classification window.
Figure 35:
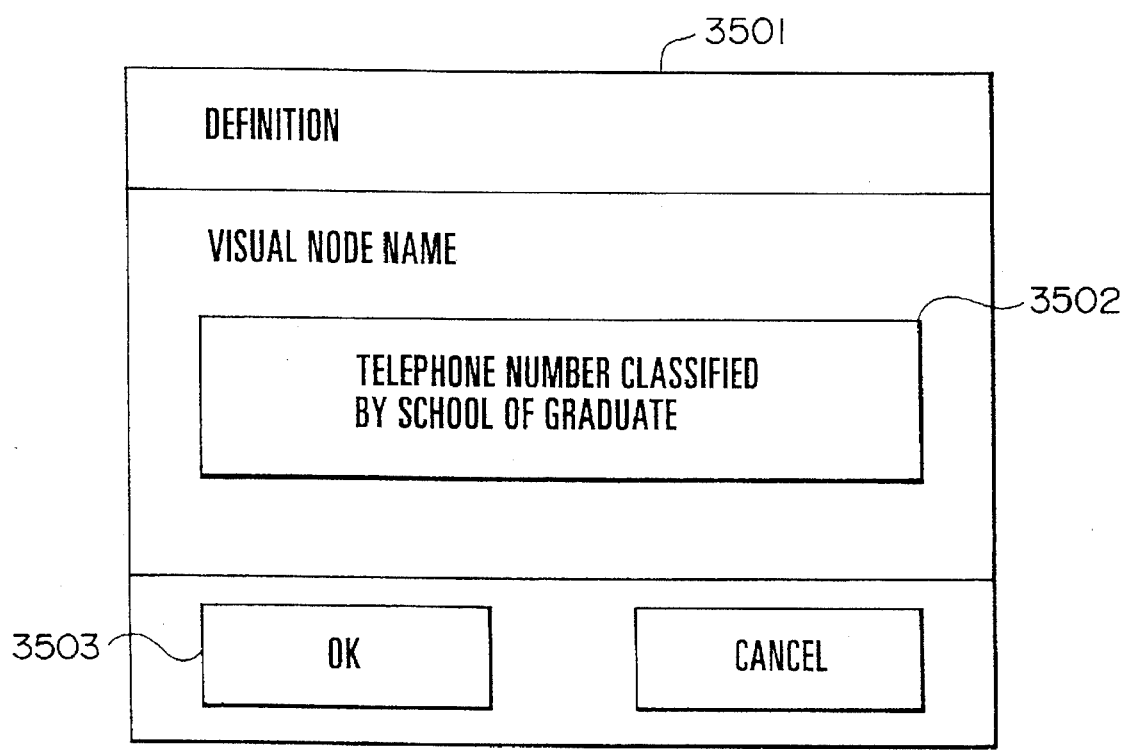
FIG. 35 is a diagram showing the window for entering the name of a classification representative node.

For example, when the user selects "show attributes" from pull-down menu below "view" of menu in FIG. 27, a pop-up window (attribute selection window) 3301 appears as shown in FIG. 33. Listed in the attribute selection window are attributes affixed to the sub-concept of "person". If the user selects "telephone number" 3308 on the list, the classified tree is revised as shown in FIG. 34. The figure reveals that "Tanaka Yoko" 3407 who is a "graduate" 3403 of "A-university" 3404 has a telephone number of "11-1111" 3411.

In another case when the user selects "change object" 2410 from pull-down menu below "view" of menu in FIG. 24 in steps 4404 and 4411, the system displays sub-concepts of the object concept in the sub-conceptual window in step 4415. The system finds in step 4416 as to whether the mouse is clicked at a node in the sub-conceptual window. In response to a user's click action, the system re-classifies concepts based on the newly selected object concept and revises the display in step 4417.

For example, by selecting "change object" 2410 of FIG. 24 from pull-down menu below "view" of menu on the screen of classified tree shown in FIG. 27, the user can alter the object concept of classification. In this example, the user intends to alter the object of classification from "person" to "female" that is a sub-concept of "person", and clicks the mouse at "female", and consequently the display of FIG. 27 is revised as shown in FIG. 34. The screen displays telephone numbers of concepts resulting from the classification for only the sub-concept of "female" based on the relation "school of graduate" 3403.

By selecting "save" 2405 from pull-down menu below "file" of menu 43 FIG. 24 in steps 4404 and 4405, the user can preserve the produced classified tree. In the first step 4406, the system displays a name entry window for classification representative nodes so that the user enters the name of classified tree, and then defines the classification representative node ID and entered tree name. In the next step 4407, the system defines internal data of classified tree in correspondence to the classification representative nodes. The system displays the classified tree below the object concept in the sub-conceptual window in step 4408.

Figure 36:
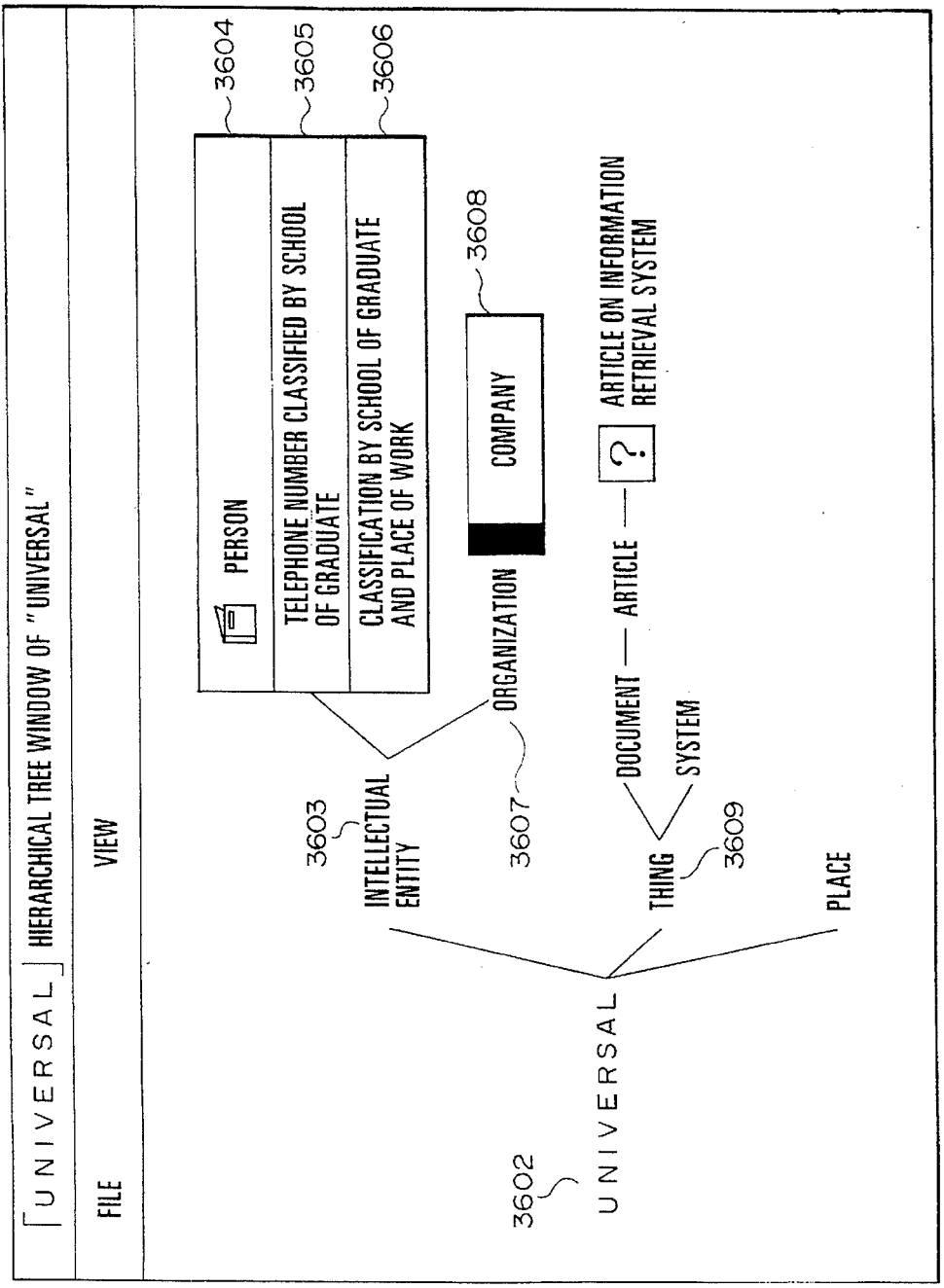
FIG. 36 is a diagram showing an example of display of the sub-conceptual window after a classification representative node has been defined.

For example, when the user selects "save" from pull-down menu below "view" of menu on the screen of the classified tree shown in FIG. 34, a pop-up window (name entry window for classification representative nodes) 3501 appears. In this window, the user enters "telephone numbers classified by school of graduate" 3502 as a node name, and then selects "OK" 3503 from menu. Consequently, a node of "telephone number classified by school of graduate" 3605 is defined and displayed next to the "person" 3604 in the sub-conceptual window as shown in FIG. 36.

Figure 37:
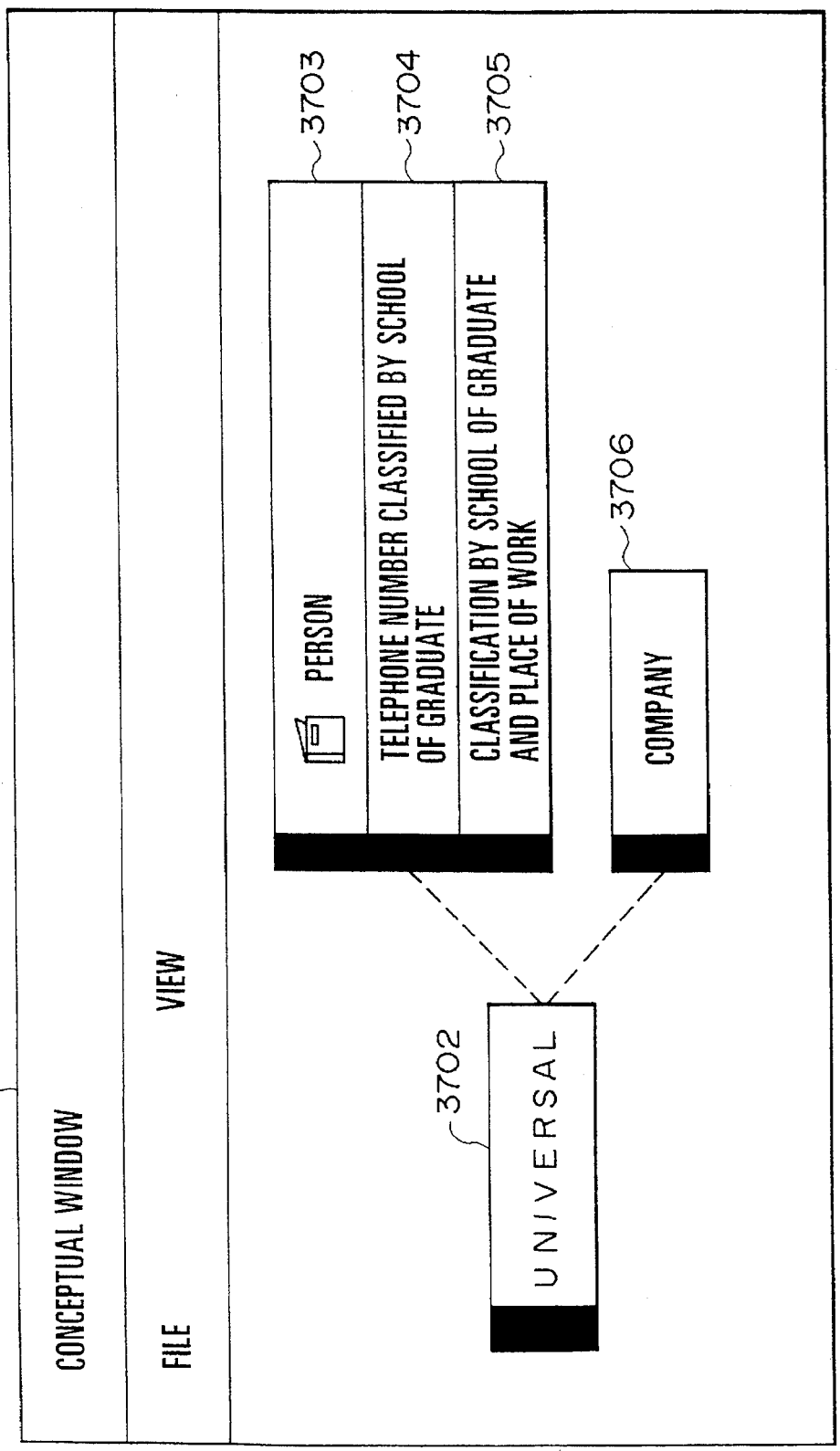
FIG. 37 is a diagram showing an example of display of the conceptual window after a classification representative node has been defined.

It is also possible for the user to define and display persons in terms of "classification by school of graduate and place of work" 3606 for the classified tree of FIG. 30. If "person" is a conceptual representative node, "telephone number classified by school of graduate" 3704 and "classification by school of graduate place of work" 3705 will be displayed next to the conceptual representative node "person" 3703 as shown in FIG. 37. When the user selects the classification representative node "telephone number classified by school of graduate" 3605 in FIG. 36, the window shown in FIG. 34 is popped up, and when the user further selects "place of work classified by school of graduate" 3606, the window shown in FIG. 30 will be popped up.

I claim:

1. A method of displaying a hierarchical tree of nodes, each node of which comprises an item of information representing a concept defining a noun, a name of numerical value or a unit, wherein at least two of said concepts have an is-a relation as a hierarchical relationship therebetween, a generic relation comprising a general relation as a non-hierarchical relationship therebetween or an instance relation that comprises an exemplified relation of a corresponding generic relation, said method comprising the steps of:

displaying a hierarchical tree of nodes indicative of is-a relations among the concepts;

selecting a first node from the hierarchical tree of nodes;

displaying, in response to the first node, the selected first node and a partial hierarchical tree of nodes lower than the selected first node;

displaying an attribute representing the generic relation corresponding to the instance relation which exists among the nodes of the partial hierarchical tree;

selecting an attribute from among the displayed attributes;

classifying the partial hierarchical tree of nodes according to the selected attribute so as to extract nodes associated with the selected attribute; and displaying the classified partial hierarchical tree.

2. The hierarchical structure display method according to claim 1, further including the steps of:

displaying nodes associated with the selected attribute;

inputting a second node selected by a user from among the nodes associated with the selected attribute;

classifying the partial hierarchical tree of nodes according to the selected attribute and the second node; and displaying the classified partial hierarchical tree.

3. The hierarchical structure display method according to claim 1, further including the steps of:

displaying nodes and their lower nodes as a second partial hierarchical tree associated with the selected attribute;

inputting a second node selected by a user from among the nodes of the second partial hierarchical tree;

classifying the second partial hierarchical tree of nodes according to the selected second node; and displaying the classified second partial hierarchical tree.

4. The hierarchical structure display method according to claim 1, further including the steps of:

displaying nodes as a second partial hierarchical tree associated with the selected attribute;

inputting a second node selected by a user from among the nodes of the second partial hierarchical tree;

classifying the second partial hierarchical tree of nodes according to the selected second node; and displaying the classified second partial hierarchical tree.

5. The hierarchical structure display method according to claim 1, further including the step of displaying nodes associated with the classified partial hierarchical tree.

6. The hierarchical structure display method according to claim 1, further including the steps of:

replacing the first node with a lower node from the first node; and, displaying attributes according to the lower node.

7. The hierarchical structure display method according to claim 1, further including the step of displaying the classified partial hierarchical tree together with the first node.

* * * * *